United States Patent
Young

(10) Patent No.: US 10,801,425 B2
(45) Date of Patent: Oct. 13, 2020

(54) SYSTEM AND METHOD FOR ENGINE CONTROL

(71) Applicant: General Electric Company, Schenectady, NY (US)

(72) Inventor: Henry Todd Young, Erie, PA (US)

(73) Assignee: GE GLOBAL SOURCING LLC, Norwalk, CT (US)

( * ) Notice: Subject to any disclaimer, the term of this patent is extended or adjusted under 35 U.S.C. 154(b) by 0 days.

(21) Appl. No.: 16/139,462

(22) Filed: Sep. 24, 2018

(65) Prior Publication Data

US 2019/0023271 A1 Jan. 24, 2019

Related U.S. Application Data

(63) Continuation-in-part of application No. PCT/US2018/026496, filed on Apr. 6, 2018, and a
(Continued)

(51) Int. Cl.
*F02D 31/00* (2006.01)
*B60K 6/20* (2007.10)
*B60W 30/182* (2020.01)

(52) U.S. Cl.
CPC .............. *F02D 31/001* (2013.01); *B60K 6/20* (2013.01); *B60W 30/182* (2013.01); *B60W 2510/0652* (2013.01); *B60W 2510/0661* (2013.01); *B60W 2520/10* (2013.01); *B60W 2540/215* (2020.02); *B60W 2552/15* (2020.02); *B60W 2554/801* (2020.02); *B60W 2710/0644* (2013.01); *B60W 2710/0661* (2013.01); *B60Y 2200/92* (2013.01); *B60Y 2300/182* (2013.01); *F02D 2200/101* (2013.01); *F02D 2200/1002* (2013.01);
(Continued)

(58) Field of Classification Search
CPC . B60W 2710/0661; B60W 2510/0652; B60W 2510/0661; F02D 2200/1012
See application file for complete search history.

(56) References Cited

U.S. PATENT DOCUMENTS 7,108,634 B2 * 9/2006 Kumazawa ............. F16D 48/08
  477/176
8,467,926 B2 * 6/2013 Perkins ................. B60W 10/08
  701/22
(Continued)

FOREIGN PATENT DOCUMENTS

JP 2015-003528 A 1/2015
WO 2017024217 A2 2/2017

OTHER PUBLICATIONS

International Preliminary Report on Patentability for Application No. PCT/US2018/026496, dated Oct. 17, 2019, (14) pages.
(Continued)

*Primary Examiner* — Kevin R Steckbauer
(74) *Attorney, Agent, or Firm* — Christopher R. Carroll; The Small Patent Law Group LLC

(57) ABSTRACT

A method includes reducing automatically a speed of an engine from a first speed value to a second speed value in response to both the first speed value being at or above a first speed threshold value and a rate of change of one or both of (i) engine power and (ii) the engine speed is substantially zero for a designated period.

21 Claims, 10 Drawing Sheets

Related U.S. Application Data continuation-in-part of application No. 14/856,747, filed on Sep. 17, 2015, now Pat. No. 10,081,349.

(60) Provisional application No. 62/483,037, filed on Apr. 7, 2017, provisional application No. 62/067,396, filed on Oct. 22, 2014.

(52) U.S. Cl.
CPC ............... *F02D 2200/1012* (2013.01); *F02D 2200/501* (2013.01); *F02D 2200/702* (2013.01); *F02D 2250/21* (2013.01); *F02D 2250/24* (2013.01); *F02D 2250/26* (2013.01)

(56) References Cited

U.S. PATENT DOCUMENTS

| | | | | |
|---|---|---|---|---|
| 8,467,927 | B2* | 6/2013 | Thompson | B60W 20/00 701/22 |
| 8,718,857 | B2* | 5/2014 | Perkins | B60W 10/08 701/22 |
| 9,885,294 | B2* | 2/2018 | Park | F02D 41/021 |
| 10,081,349 | B2* | 9/2018 | Young | B60W 20/10 |
| 10,377,368 | B2* | 8/2019 | Miyaishi | B60W 10/08 |
| 2004/0192504 | A1* | 9/2004 | Kumazawa | F16D 48/08 477/166 |
| 2013/0116866 | A1* | 5/2013 | Perkins | B60W 10/06 701/22 |
| 2013/0116867 | A1* | 5/2013 | Thompson | B60W 10/06 701/22 |
| 2013/0281257 | A1* | 10/2013 | Perkins | F02D 29/02 477/3 |
| 2014/0343829 | A1* | 11/2014 | Park | F02D 41/021 701/110 |
| 2014/0350766 | A1 | 11/2014 | Wang et al. | |
| 2016/0114783 | A1* | 4/2016 | Young | B60W 20/10 701/22 |
| 2018/0072308 | A1* | 3/2018 | Miyaishi | B60W 10/08 |

OTHER PUBLICATIONS

International Search Report and Written Opinion issued in connection with corresponding PCT Application No. PCT/US2018/026496 dated Jul. 25, 2018.

Examination report No. 1 for Standard Patent Application dated May 13, 2020 for corresponding Australian Application AU2018248345. 6 Pages.

* cited by examiner

SYSTEM AND METHOD FOR ENGINE CONTROL

CROSS-REFERENCE TO RELATED APPLICATIONS

This application is a continuation-in-part of PCT Application No. PCT/US2018/026496, filed 6 Apr. 2018, which claims priority to U.S. Provisional Application No. 62/483,037 filed 7 Apr. 2017. This application also is a continuation-in-part of U.S. patent application Ser. No. 14/856,747, filed 17 Sep. 2015, which claims priority to U.S. Provisional Application No. 62/067,396 filed 22 Oct. 2014. All the aforementioned applications are incorporated by reference herein in their entireties for all purposes.

BACKGROUND

Technical Field

Embodiments of the subject matter disclosed herein relate to controlling engine speed in a vehicle.

Discussion of Art

At least some vehicle operators may want a vehicle to have high performance. High performance may maximize the productivity of the vehicle. Depending on the vehicle type and the end use, productivity may be in the form of increased speed, greater haulage or tractive effort, faster time to reach full power, and the like. Some diesel electric drive systems have been tuned to extract the maximum power out of the engine. Sometimes there may be a tradeoff between power output and fuel efficiency. It may be desirable to have a vehicle control system that differs from those that are currently available.

BRIEF DESCRIPTION

In one embodiment, a method includes reducing automatically a speed of an engine from a first speed value to a second speed value in response to both the first speed value being at or above a first speed threshold value and a rate of change of one or both of (i) engine power and (ii) the engine speed is substantially zero for a designated period.

In one embodiment, a vehicle includes an electric drive train, an engine, and a controller. The speed of the engine is mechanically decoupled from a speed of the vehicle. The controller controls a speed of the engine and further operates the engine in at least two or more operation modes; the controller is configured to switch between the operation modes in response to a designated set of input triggers. The operation modes include a performance mode that maintains the engine speed at a first, higher RPM, and a fuel-saver mode that maintains the engine speed at a second, lower RPM than in the performance mode. The input triggers are based at least in part on one or more of the following: elapsing of a designated period that starts after a rate of change in one or both of (i) engine power and (ii) the engine speed is substantially zero; spatial relationship of the vehicle relative to another vehicle; a grade upon which the vehicle is disposed; a ground speed of the vehicle; a manual setting by an operator or controller indicating a desire or need for either fuel savings or performance; a throttle setting for the engine that is at fifty percent or more of the maximum available throttle settings for the engine; a power output of the engine that is at fifty percent or more of the maximum available power output of the engine; and/or a payload of the vehicle is fifty percent or more of the maximum available payload of the vehicle.

In one embodiment, a system includes an engine and a controller configured to control the speed of the engine. The controller also operates the engine in at least two or more operation modes including a first mode associated with a first engine speed and a second mode that maintains the engine speed at a second engine speed that is lower than the first engine speed. The controller also switches between the operation modes in response to an elapsing of a designated period that starts after a rate of change in one or both of (i) engine power and (ii) the engine speed is substantially zero.

The controller may switch the operation mode based on one or more of a spatial relationship of the vehicle relative to another vehicle, a grade upon which the vehicle is disposed, a ground speed of the vehicle, a manual setting by an operator or controller indicating a desire or need for either fuel savings or performance, a throttle setting for the engine that is at fifty percent or more of the maximum available throttle settings for the engine, a power output of the engine that is at fifty percent or more of the maximum available power output of the engine, and/or a payload of the vehicle is fifty percent or more of the maximum available payload of the vehicle.

BRIEF DESCRIPTION OF THE DRAWINGS

The invention will be better understood from reading the following description of non-limiting embodiments, with reference to the attached drawings, wherein below.

DETAILED DESCRIPTION

Figure 1:
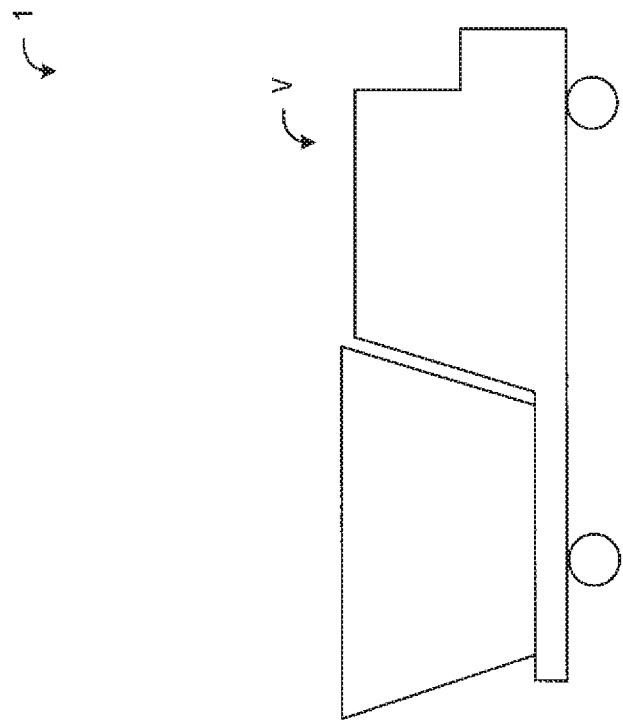
FIG. 1 shows a schematic diagram of a vehicle convoy.

Embodiments of the subject matter disclosed herein relate to optimizing engine operating points and power for full throttle command. In contrast to a traditional operating mode in which a vehicle may run at a full engine speed (e.g., 1900 RPM) and maximum power when an operator commands 100% throttle, embodiments disclosed herein may have a first operating mode where the engine speed is initially set to a first, higher speed, and then to reduce fuel consumption, the first mode is switched to a second operating mode at a second, lower speed without the operator commanding a reduction in the throttle level.

The approach described herein may be employed in a variety of engine types, and in a variety of engine-driven systems selected with reference to application specific criteria. While many of the examples provided are mobile or semi-mobile, some of these systems may be stationary. Mobile platforms include self-propelled vehicles, while semi-mobile platforms may be relocated between operational periods, such as mounted on flatbed trailers. Suitable vehicles may include those whose engines are mechanically decoupled from the propulsion system (e.g., vehicles that lack mechanical transmissions for locomotion, but instead, for example, have engines that drive a generator for generating electrical power to run electrical traction motors). Such vehicles can include rail vehicles, mining vehicles, agricultural vehicles, marine vessels, aircraft, passenger vehicles, drones and robotic equipment, and off-highway vehicles (OHV). For clarity of illustration, a haul vehicle (e.g., a mine haul vehicle, diesel electric haul truck, etc.) may be used as an example of a mobile platform supporting a system incorporating an embodiment of the invention.

During engine operation, an engine controller automatically reduces a speed of an engine from a first speed value to a second speed value in response to both the first speed value being at or above a first speed threshold value and a rate of change of one or both of (i) engine power and (ii) the engine speed being substantially zero for a designated period.

In one embodiment, the first speed value is a speed at which the engine provides a designated performance level or a designated torque level in a designated range of performance or torque during an acceleration transient event.

The controller may ramp down the engine speed at a controlled rate until the second speed value is achieved, and the second speed value is an engine speed that is more fuel efficient than the first speed value. Of note, engines have optimized operating points and their output and efficiency is not linear with engine speed. Thus, it may be that at full power output an engine is not optimally fuel efficient. Once a steady state has been achieved and maintained for a determined amount of time, then the controller may order the engine speed lowered to a second, fuel-optimized RPM level. The second RPM level may be at a fuel optimized operating point proximate to the requested power demand or throttle level.

In one embodiment, if the controller receives a request for an increase in one or more of engine power, engine torque, engine speed, or vehicle speed from an operator or a controller of the vehicle, it responds by initiating the ramping up of the engine speed from a lower engine starting speed value to the first engine speed value. Once at the first engine speed value, a timer or a sensor indicates to the controller that a steady state operation has begun. After a determined period of steady state, the controller initiates a switch to a second operating state that is proximate, but lower, in performance but has better fuel economy. In another embodiment, other desirable characteristics are used instead of fuel economy such as engine wear, noise level, emission output levels, or the like.

The controller may ramp up the engine speed at a controlled rate a until first speed value is achieved, and the ramping up rate may be at or near (e.g., in one embodiment, at or within 10%, and in another embodiment, at or within 5%) a maximum available rate of ramping up the engine speed. Similarly, the controller may ramp down the engine speed at a controlled rate from the first speed value to the second speed value. The second speed value may be, as noted herein, an engine speed that is more fuel efficient than the engine when operating at the first speed value.

The controller may receive and/or use a measured, estimated or calculated speed of the vehicle to determine one or both of a ramp down rate of the engine speed from the first speed value to the second speed value, and the length of the designated period for which the rate of change of one or both of (i) engine power and (ii) the engine speed is substantially zero before initiating the ramping down of the engine speed from the first speed value to the second speed value. That is, operation of the vehicle at different speeds may cause the controller to ramp the rate of the engine speed change differently. At lower speeds, for example, the controller may ramp the engine rate up or down more slowly than when the vehicle is operating at higher speeds. For example, the rate of change may need to be faster at higher speeds to account for decreased reaction time by an operator, while at lower speeds the slower ramp rate may save fuel and/or wear-and-tear on the engine and on other components.

One or both of a ramp down rate of reducing the engine speed from the first speed value to the second speed value, and/or the length of the designated period for which the rate of change is substantially zero, may be determined by the controller based at least in part on a status of the vehicle being in a loaded, partially loaded, or empty state. For example, lighter unloaded vehicles may be more responsive than heavier loaded vehicles, and so the ramp rate may need to be quicker to accommodate. Likewise, a heavy loaded vehicle may damage components if the ramp rate is too fast. Thus, in one embodiment, the controller may determine if the vehicle is carrying a payload, so as to set the designated period to be shorter than if the vehicle is about empty. "Payload" refers to removable cargo or passengers, and not to the vehicle/vehicle parts, fuel/consumables, or vehicle operators/crew. In an embodiment, "about empty" means 5% or less of a maximum rated payload capacity of the vehicle.

In an embodiment, the controller is configured to determine that the vehicle is carrying a payload, responsive to which the controller operates in a first mode where the designated period has a first duration. The controller is further configured to determine that the vehicle is about empty, responsive to which the controller operators in a second mode where the designated period has a second duration which is longer than the first duration (i.e., the duration of the designated period when the vehicle carries a payload is shorter than the duration of the designated period when the vehicle is about empty). In another embodiment, the controller is configured to determine that the vehicle is carrying a payload, responsive to which the controller operates in a first mode where the designated period has a first duration. The controller is further configured to determine that the vehicle is empty (no payload), responsive to which the controller operators in a second mode where the designated period has a second duration which is longer than the first duration (i.e., the duration of the designated period when the vehicle is carrying a payload is shorter than the duration of the designated period when the vehicle is empty).

Determinations of vehicle payload status (payload vs. empty or about empty) may be based on received sensor signals (e.g., sensors that sense a load on a dump bed or other cargo space of the vehicle), vehicle movement or responsiveness (e.g., how fast the vehicle accelerates at a designated throttle level relative to known acceleration rates when the vehicle is empty), signals indicative of operator input regarding vehicle payload, signals relating to data/information about the payload (e.g., a known weight of the payload as per offboard measurements, manifest information, material type and volume), etc.

In another embodiment, the degree to which the designated period is shorter when the vehicle carries a payload (vs. when the vehicle is about empty or empty) varies based on the payload magnitude. For example, responsive to when the payload is relatively light (e.g., more than 5% maximum rated payload but no more than 25% maximum rated payload), the designated period has a first duration; responsive to when the payload is heavier (e.g., more than 25% maximum rated payload but no more than 75% maximum rated payload), the designated period has a second duration; and responsive to when the payload is heaviest (e.g., more than 75% rated maximum payload), the designated period has a third duration, where the first duration is less than the duration of the designated period when the vehicle is empty, the second duration is less than the first duration, and the third duration is less than the second duration. Additional or different demarcations may be used, and/or the duration may vary, in an inverse linear manner, as a function of the payload amount (e.g., minimum duration for maximum payload, and maximum duration for no payload or about empty).

In one embodiment, one or both of a ramp down rate of the engine speed from the first speed value to the second speed value, and/or the length of the designated period for which the rate of change is substantially zero, is based at least in part on a grade on which the vehicle is located at the time the engine speed is to transition from the first speed value to the second speed value. For example, in an embodiment, a controller is configured to automatically reduce a speed of an engine from a first speed value to a second speed value in response to both: the first speed value being at or above a first speed threshold value; and a rate of change of (i) engine power and/or (ii) the engine speed being substantially zero for a designated period. The controller is configured to control reduction of the speed of the engine from the first speed value to the second speed value at a ramp down rate that is based at least in part on the grade on which the vehicle is located at the time the engine speed is to transition from the first speed value to the second speed value. Alternatively or additionally, the controller is configured to initiate reducing the speed responsive to the engine power and/or the engine speed being substantially zero for the designated period, where the controller is configured to base the length of the designated period at least in part on the grade on which the vehicle is located at the time the engine speed is to transition from the first speed value to the second speed value.

The controller may be configured to determine a ramp down rate of the engine speed from the first speed value to the second speed value, and/or the length of the designated period, based at least in part on an absolute throttle condition, such that a requested power change must be larger than a designated threshold value in order to initiate the ramping down, or based at least in part on an environmental condition in which the vehicle may be situated. An example of an environmental conditions is a determined operating rule that the vehicle must be spaced from a second vehicle by a designated distance in order for the controller to initiate the ramping down, and the distance is designated at least in part based on the vehicle speeds of each of the vehicle and the second vehicle.

Another factor that the controller may reference is whether the engine is producing fifty percent (50%) or more of the engine's maximum power output or is producing less than fifty percent (50%) of the engine's maximum power output. If the engine is producing about 50% or more power the controller may initiate switching to or maintaining an operating mode of the engine to be more responsive in terms of the designated period being longer compared to the engine producing less than about 50% of its maximum power. For example, in one embodiment a controller is configured to determine a power state of the engine. The power state is indicative of the currently-occurring power output of the engine, as determined, e.g., by sensor signals (such as crankshaft RPM, or correlating vehicle acceleration/movement to one or more of vehicle mass or time or distance traveled), fueling levels (how much fuel is being supplied to and/or combusted by the engine), electrical power output (in the case where the engine drives a generator for powering electrical traction motors), models/estimates (potentially with sensor input of vehicle characteristics), etc. For a determination relative to a 50% level, the power state has one of two values: the engine is producing about fifty percent (50%) or more of the engine's maximum power output; or the engine is producing less than fifty percent (50%) of the engine's maximum power output. The controller is configured, in a first mode responsive to the power state indicating that the engine is producing about 50% or more of the engine's maximum power output, to switch or maintain an operating mode of the engine to be more responsive in terms of the designated period being longer than compared to a length of time of the designated period when the power state is indicative of the engine producing less than about 50% of its maximum power. For example, the controller may be further configured, in a second mode responsive to the power state indicating that the engine is producing less than about 50% of the engine's maximum power output, to operate the engine (as set forth herein) in terms of the designated period being shorter than compared to the length of time of the designated period when the power state is indicative of the engine producing about 50% or more of its maximum power. (In embodiments, "about" refers to plus or minus one percent. In other embodiments, the power state has two possible values: in the first, the power state corresponds to 50% or more, and in the second the power state corresponds to less than 50%. An engine's maximum power output may be available as part of the engine specification as per the manufacturer, or it may be determined by operating the engine at its maximum fueling level and/or throttle level relative to a known load.)

In embodiments, the controller may base the designated period and/or ramping rate on whether the vehicle is stopped, in which case the designated period may be shorter than if the vehicle is moving. Specifically, in embodiments, the controller is configured to determine a movement state of the vehicle. The movement state relates to the vehicle moving (a first possible state of the vehicle) and to the vehicle being stopped/stationary/not moving (a second possible state of the vehicle). The movement state may be determined based on movement sensor signals, GPS information, video analytics of a video signal, etc. The controller is configured, in a first mode of operation responsive to the movement state corresponding to the vehicle moving, for the designated period to be longer than when the movement state corresponds to the vehicle being stopped. The controller is further configured, in a second mode of operation responsive to the movement state corresponding to the vehicle being stopped, for the designated period to be shorter than when the movement state corresponds to the vehicle moving. For example, the controller may be configured, in the first mode, to automatically reduce the speed of the engine from the first speed value to the second speed value in response to both the first speed value being at or above the first speed threshold value and the rate of change of one or both of (i) engine power and (ii) the engine speed being substantially zero for the designated period having a first non-zero time length, and in the second mode, to automatically reduce the speed of the engine from the first speed value to the second speed value in response to both the first speed value being at or above the first speed threshold value and the rate of change of one or both of (i) engine power and (ii) the engine speed being substantially zero for the designated period having a different, second non-zero time length, where the first time length is longer than the second time length.

These and other factors disclosed herein may contribute to the period for which the steady state needs to be maintained before initiating the ramp from or to a different second engine speed, according to one inventive aspect. This ramp rate may differ from the more general ramp rate associated with the change of the throttle level by the controller or operator to a new throttle level. For example, responsive to a general operator throttle-down command, the controller may be configured to reduce engine speed at a first ramp rate, and responsive to a current engine speed being at or above a first speed threshold value and a rate of change of one or both of (i) engine power and (ii) the engine speed being substantially zero for a designated period, the controller is configured to automatically (without operator input, e.g., with an operator throttle command) reduce the engine speed from the current speed to a second, lower speed at a second ramp rate that is different from the first ramp rate.

In one embodiment, the second speed value is associated with a fuel-saving power rating. Also, the fuel-saving power rating differs from a maximum power rating of the engine by more than a designated amount. Alternatively or additionally, the second speed value differs from a maximum speed rating of the engine by more than a designated amount. "Fuel-saving" means a lower fuel usage rate relative to one or more other power ratings.

Thereby, in an embodiment, a controller is configured to automatically reduce a speed of an engine from a first speed value to a second speed value in response to both the first speed value being at or above a first speed threshold value and a rate of change of one or both of (i) engine power and (ii) the engine speed being substantially zero for a designated period, where the second speed value is associated with a fuel-saving power rating, e.g., the engine uses fuel at a lower rate at a power rating of the second speed value than one or more other power ratings. The fuel-saving power rating differs from a maximum power rating of the engine by more than a first designated amount, and/or the second speed value differs from a maximum speed rating of the engine by more than a second designated amount.

According to an embodiment of the invention, a vehicle is provided that includes an electric drive train, an engine, and a controller. The speed of the engine may be mechanically decoupled from a speed of the vehicle. The controller controls a speed of the engine and operates the engine in at least two (i.e., two or more) operation modes. The controller further can switch between the operation modes in response to a designated set of input triggers. The operation modes include a performance mode that maintains the engine speed at a first, higher RPM, and a fuel-saver mode that maintains the engine speed at a second, lower RPM than in the performance mode. ("Performance" may refer to a higher fuel usage rate, e.g., more power, relative to "fuel-saver," which may refer to a lower fuel usage rate, e.g., less power.) The input triggers are based at least in part on one or more of the following: elapsing of a designated period that starts after a rate of change in one or both of (i) engine power and (ii) the engine speed is substantially zero; spatial relationship of the vehicle relative to another vehicle; a grade upon which the vehicle is disposed; a ground speed of the vehicle; a manual setting by an operator or controller indicating a desire or need for either fuel savings or performance; a throttle setting for the engine that is at fifty percent or more of the maximum available throttle setting for the engine; a power output of the engine that is at fifty percent or more of the maximum available power output of the engine; and/or a payload of the vehicle is fifty percent or more of the maximum available payload of the vehicle.

In one embodiment, the engine speed in the performance mode is at about 1900 RPM and in the fuel-saver mode is at about 1800 RPM, and the designated period is in a range of from about 5 seconds to about 3 minutes. The engine speeds and designated periods may be selected with reference to application specific criteria. During operation, the controller is configured to control the ramp down rate in engine speed from the performance operation mode (i.e., from the engine speed in the performance operating mode) to the fuel-saver operation mode (i.e., to the lower engine speed in the fuel-saver operation mode) at a designated rate of change that is less than the maximum rate of change of engine speed possible for the engine.

Optionally, the controller may be configured to command a third operational state (i.e., a third operation mode) in which the engine operates at idle, and the controller can further switch the engine from the fuel saver operation mode to the idle, third operation mode. The controller may be configured to initiate switching to the third operation mode responsive to one or more designated criteria relating to when it may be desired or appropriate for the engine to idle, such as the vehicle being stopped for at least a designated non-zero time period, or the vehicle traveling below a designated, relatively low speed (but greater than stopped) for at least a designated non-zero time period, or based on throttle or other control settings (e.g., vehicle placed in 'park'), or based on designated rates of change of the speed or power relative to designated time periods and threshold levels, etc.

In an embodiment, the controller may be configured to automatically reduce the speed multiple times, according to two or more tiers of speed reduction. For example, the controller may be configured to automatically reduce a speed of an engine from a first speed value to a second speed value in response to both the first speed value being at or above a first speed threshold value and a rate of change of one or both of engine power and/or the engine speed being substantially zero for a first designated period. The controller is further configured to automatically reduce the speed of the engine from the second speed value to a third speed value, responsive to the rate of change of one or both of the engine power and/or the engine speed being substantially zero for a second designated period that commences when the third speed value is reached. The second designated period may be the same length of time as the first designated period, or a different length of time. The third speed value may represent another fuel-saver mode that uses fuel at a lower rate than operation at the second speed, where, for example, operation at the third speed value is still within a designated or desired range of engine performance associated with operation of the vehicle at the first, original speed value.

A system according to aspects of the invention may include an engine and a controller. The controller controls the speed of the engine and operates the engine in at least two or more operation modes including a first mode associated with a first engine speed and a second mode that maintains the engine speed at a second engine speed that is lower than the first engine speed. The controller can switch between the operation modes in response to an elapsing of a designated period that starts after a rate of change in one or both of (i) engine power and (ii) the engine speed is substantially zero.

In one embodiment, the controller can switch the operation mode based on one or more of a spatial relationship of the vehicle relative to another vehicle, a grade upon which the vehicle is disposed, a ground speed of the vehicle, a manual setting by an operator or controller indicating a desire or need for either fuel savings or performance, a throttle setting for the engine that is at fifty percent or more of the maximum available throttle settings for the engine, a power output of the engine that is at fifty percent or more of the maximum available power output of the engine, and/or a payload of the vehicle is fifty percent or more of the maximum available payload of the vehicle.

An example of a mine haul vehicle embodying various aspects and features of the invention is shown in FIG. 1. In particular, a convoy 1 of two mine haul vehicles is depicted in the illustration, each labeled "V". While two vehicles are illustrated in FIG. 1, other numbers of vehicles could be included in the convoy. The convoy vehicles may be communicatively and/or mechanically coupled to each other to form a consist or platoon. During operation of the convoy, each vehicle may be independently operated to maintain a threshold distance between each vehicle, front and back as well as left and right, and/or maintain a threshold vehicle speed. Optionally, one of the vehicles may control the speed, direction, altitude, orientation, etc. of another of the vehicles. In contrast to a traditional operation, in which each vehicle may be operated at a determined accelerator pedal command (e.g., 100% throttle, also referred to as full propel call or full call) with a corresponding engine RPM, each vehicle may be controlled to an initial designated or set engine speed, engine power, or other command, and then to a second designated or set engine speed that is different than the initial engine speed.

For example, in an embodiment, a controller is disposed on a first vehicle, which is temporarily (e.g., for the duration of a given mission, trip, task, etc.) logically or mechanically coupled with a second vehicle for coordinated travel along a route. For example, the two vehicles may be, or be part of, a platoon or consist of vehicles. One or both of the vehicles may be unmanned (no on-board operator); for example, the second vehicle may have an operator and the first vehicle may be unmanned, where the operator is onboard the second vehicle at least for safety purposes, and the first vehicle is at least in part controlled by the second vehicle over a wired or wireless communication link. Thus, the controller is configured to control the first vehicle based at least in part on signals received from the second vehicle. The controller is further configured to automatically reduce a speed of an engine of the first vehicle from a first speed value to a second speed value in response to both the first speed value being at or above a first speed threshold value and a rate of change of one or both of (i) engine power and (ii) the engine speed being substantially zero for a designated period. The controller may be configured for the automatic speed reduction to be carried out, in at least one mode of operation of the first vehicle, independently of the signals received from the second vehicle. For example, in different embodiments the controller may be configured in the following manners: automatic speed reduction only upon command from the second vehicle; automatic speed reduction completely independently of commands from the second vehicle; or operation both in a mode where the speed is automatically reduced independent of commands from the second vehicle, and in another mode where the speed is automatically reduced responsive to signals from the second vehicle. This does not preclude, in any of the indicated embodiments, the possibility of speed reduction based on a spatial relationship between the two vehicles (as described elsewhere herein), but which is not commanded from one vehicle to another. A technical effect may include automatically reducing engine speed of a vehicle in a consist or platoon, which is also being controlled (at least in part) by another vehicle, for reducing fuel usage (relative to maintaining operation at the previous, higher engine speed); in terms of performance, the speed reduction may be lower than, but within a designated range of a performance level at the higher (first) speed, such that driving objectives, trip objectives, or the like of the consist or platoon are still maintained despite the engine speed reduction.

In embodiments, plural vehicles in a consist or platoon are each configured (e.g., each has a respective controller configured to) to automatically reduce engine speed responsive to the criteria described above and elsewhere herein. Such automatic control, in a vehicle that is being controlled by another vehicle, may be subservient to overriding by the controlling vehicle, or overriding based on other driving/movement/travel/road circumstances. For example, the controlled vehicle may be configured for automatic engine speed reduction, but only if doing so is compatible with commands received from the controlling vehicle, compatible with the current driving/movement/travel/road conditions, etc. Thus, the controlled vehicle may be configured to not automatically initiate reduction of engine speed, even if the criteria are met (as described herein), if doing so would, for example, bring the vehicle too close to another vehicle, cause the overall vehicle speed to be too slow relative to other vehicles, and so on ("too close" or "too slow" meaning within a designated safety or braking or other control margin).

In other embodiments, a controller in a vehicle may be configured to automatically switch operating modes responsive to the vehicle being coupled (applicable to cases of both logical coupling and mechanical coupling) to another vehicle in a platoon or consist, for coordinated travel along a route. The controller is configured to operate in a first mode responsive to the vehicle not being linked, e.g., the controller operates in the first mode when the vehicle is operating independently and is not coupled to one or more other vehicles. In the first mode, the controller is configured to automatically control reduction of engine speed according to the criteria discussed above and elsewhere herein, and not based on control communications from other vehicles. The controller is further configured to operate in a second mode responsive to the vehicle being linked, e.g., the controller operates in the second mode when the vehicle is coupled to one or more other vehicles for coordinated movement along a route, where the vehicle may control another vehicle, and/or be controlled by another vehicle. In the second mode, the controller may be configured to: initiate a speed reduction responsive to the designated criteria being met, and to also initiate a speed reduction responsive to commands from another vehicle; initiate a speed reduction responsive to the designated criteria being met, unless overridden by commands from another vehicle or based on designated driving/movement/trip/route conditions; or initiate a speed reduction only responsive to commands from another vehicle; etc.

Any of the other embodiments set forth herein may be implemented in the context of a vehicle consist or platoon, based on inter-vehicle commands, independent of inter-vehicle commands, or mixed (controller operates in one or more modes where operation, e.g., speed reduction, is independent of commands from another vehicle, and one or more modes where operation, e.g., speed reduction, is dependent on, e.g., responsive to, commands from another vehicle).

Figure 2:
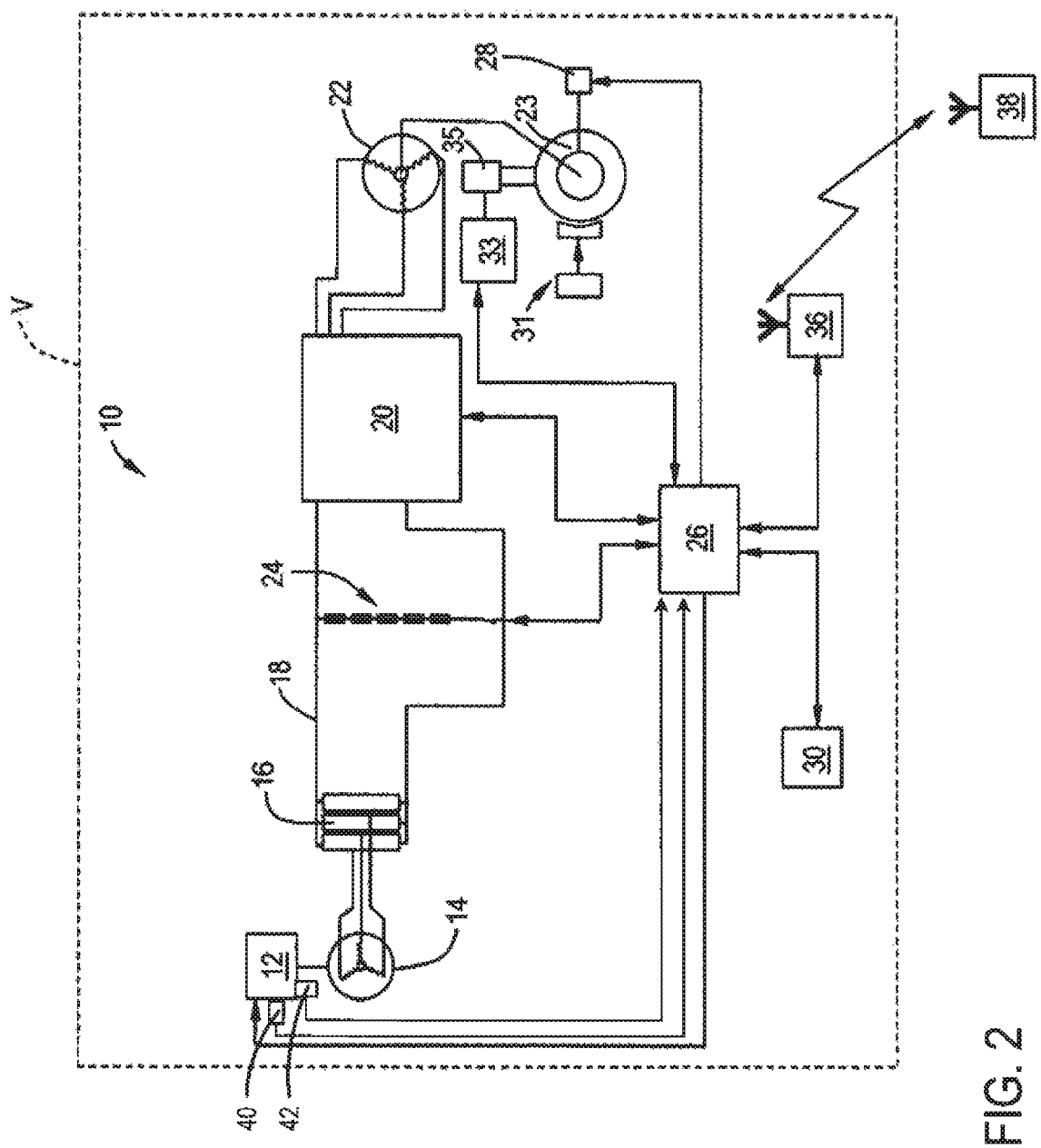
FIG. 2 shows a schematic diagram of a vehicle of the vehicle convoy of FIG. 1.

FIG. 2 is a drawing that shows an example vehicle from the convoy including a vehicle system 10. The vehicle system includes a prime mover 12. In the illustrated example, the prime mover is a diesel engine or other engine, and the term "engine" may be used interchangeably with the term "prime mover" throughout the remainder of this description. The engine may include a plurality of cylinders configured to receive fuel from a plurality of fuel injectors. The prime mover drives an alternator 14. The output of the alternator is converted into DC via a rectifier bank 16. The DC power is provided over a DC bus 18 to an inverter unit 20. The inverter unit includes DC-to-AC conversion circuitry of a known type, and also employs components such as Insulated Gate Bipolar Transistors (IGBTs) or thyristors operating as pulse width modulators (not shown) to provide an AC power to a traction motor 22 which is coupled to a wheel 23 through a known type of reduction gear (not separately shown). For the sake of illustrative simplicity, only one inverter unit and traction motor are shown, with the understanding that the vehicle may be provided with multiple traction motors driven by multiple inverter units.

While an AC-DC-AC system is described herein, is should be noted that the principles of the present disclosure may be applied to other drivetrain configurations, e.g., using an alternator or DC generator as a power source, and using AC or DC traction motors. Furthermore, the principles of the present disclosure are also applicable to other types of vehicles, such as rail vehicles or automobiles and other on-road vehicles. The vehicle may use any type of element adapted to exert a tractive force. Examples of tractive elements include wheels, axles, or translating or reciprocating structures. The term "traction motor" could encompass, for example, electric or hydraulic linear motors.

One or more chains of grid resistors 24 are connected across the DC bus 18. The grid resistors 24 may be selectively coupled to the DC bus to dissipate power generated by the traction motor and thereby provide dynamic braking. This is referred to as a "retard" function. Other electrical energy absorbing devices may be used in place of the grid resistors to dissipate and/or use the power generated, for example batteries, a regenerative system, or equipment to use the power like auxiliary systems and accessories.

The vehicle includes at least one braking device 31. The braking device may be a service, parking, or emergency brake, and may be hydraulically, mechanically, or electrically operated. Most typically, the vehicle would include a service brake system plus an emergency or parking brake system.

A microprocessor-based controller 26 has operative connections to the engine, the grid resistors, the inverter unit, and to numerous sensors within the drive train, such as a wheel speed sensor 28 coupled to the wheel. While illustrated in FIG. 2 as comprising a single unit, it is to be understood that controller may be comprised of multiple, separate control units that may be operatively coupled to each other. Among other functions, the control units of controller have the capability to control the speed of the engine, to command the inverter unit to apply current to drive the traction motor in a forward or reverse direction, to modulate the current level supplied to the traction motor, to control the amount of load placed on the engine by the alternator, and to connect the traction motor to the grid resistors through the inverter unit to effect the retarder function. The controller is provided signals from various discrete sensors of the vehicle, including but not limited to signals from an engine speed sensor 40 and an engine output sensor 42. In addition to the various discrete sensors, the controller is provided with feedback from the inverter unit which is indicative of the magnitude of the torque being applied to the traction motor. The controller is also provided with a mechanism for determining the weight of a payload carried by the vehicle, such as via a suspension pressure calculation. For example, the vehicle may include a payload meter 33 which computes total vehicle weight based on sensed air pressure in the vehicle's suspension struts 35. The payload meter can communicate the total vehicle weight to the controller over a communications channel such as a serial bus. The payload may be determined in another suitable manner, such as provided to the controller from an off-board sensor (e.g., a vehicle scale).

A control panel 30, also referred to as a "driver information display" is coupled to the controller. The control panel includes a display for presenting information to the driver, and one or more controls for operating the vehicle. In some examples the display is a multi-line LED, and the controls are configured as a plurality of fixed and configurable keys. It will be understood that the control panel could be configured differently, for example it could take the form of a touch screen interface. In addition to the control panel the vehicle also includes one or more discrete vehicle controls operatively coupled to the controller, such as accelerator pedal (not shown).

Optionally, the controller may include means for two-way communication with a remote operator or dispatcher (see FIG. 1, shown schematically at 38). As illustrated the controller is coupled to a transceiver 36 which communicates with the dispatcher through a wireless link.

The controller may include non-transitory instructions executable to carry out one or more methods described herein. As explained above, the controller may be comprised of multiple control units operatively connected to one another. For example, a first control unit may regulate fueling of the engine and a second control unit may regulate load placed on the engine by the alternator. The first control unit may regulate fueling of the engine by sending a signal to adjust an opening degree and/or duration of one or more fuel injectors of the engine (e.g., the signal may cause a solenoid in the fuel injector to be energized for a given duration to open the fuel injector). The second control unit may regulate load placed on the engine may adjusting the electrical load on the alternator, which is proportional to the load placed on the engine by the alternator. To adjust the electrical load on the alternator, the second control unit may selectively couple the alternator to the resistive grids, increase output of the traction motors, etc. Additionally, the second control unit may send an engine speed command to the first control unit.

To reduce fuel consumption, a vehicle having a drive system may be operated at a first set engine horsepower when a throttle request is received. The first set engine horsepower may be based on operating parameters, determined in advance based on capabilities of the vehicle, or other suitable parameters. To achieve operation at the first set horsepower, once a maximum throttle request is received and the first set horsepower determined, a target first engine speed is obtained, for example from a look-up table, based on the first set horsepower. The target first engine speed is used as input to the fuel controller (e.g., the first control unit described above), and fuel amounts supplied to the engine may be adjusted to reach the target engine speed. During the period of time where engine speed is increasing (ramping up) from the initial speed to the target first speed, engine horsepower may be unregulated or may be controlled by the controller. Once the target engine speed is reached (or once an engine fueling limit is reached), the drive system controller (e.g., the second control unit described above) may adjust the load placed on the engine by the alternator until the set horsepower is reached. Once a steady state of operation has been achieved and then maintained for a designated period the controller ramps down the engine speed to a more fuel efficient operating speed while maintaining about the same level of performance, but less performance than when the engine operates at the first speed. In this way, the engine may be operated at an operating point for desired torque and efficiency, and the engine speed maintained at a lowest possible speed for the desired engine output level.

Figure 3:
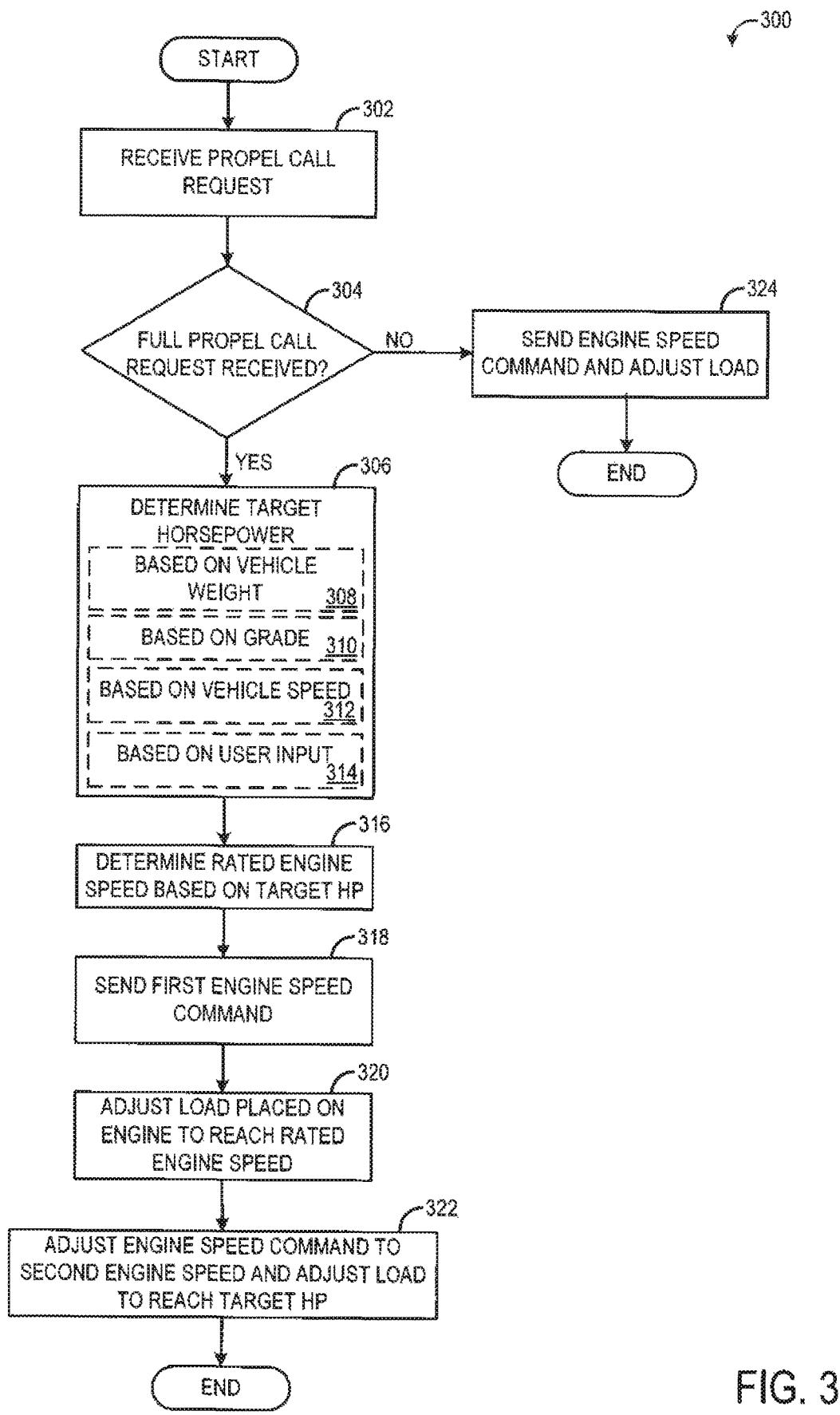
FIG. 3 is a flow chart illustrating an example method for operating the vehicle of FIG. 2.

Turning now to FIG. 3, a method 300 for operating an engine at a target horsepower is presented. The method may be performed by a controller, such as the controller described above, in combination with various sensors and actuators, such as an engine speed sensor, engine output sensor, fuel injectors, etc., according to instructions stored on memory of the controller. In one example, the method is performed by the second control unit of controller, described above, that controls drive system (e.g., controls the load placed on the engine by the alternator). At 302, the method includes receiving a propel call request. The propel call request may include an operator of the vehicle depressing an accelerator pedal, for example, or other input mechanism requesting a given vehicle speed. At step 304, the method determines if the request includes a full propel call request. A full propel call request may include a fully depressed accelerator pedal, a 100% throttle request, or other maximum vehicle speed request. If a full call request is not received, the method proceeds to step 324 to send an engine speed command to a separate fuel control unit (e.g., the first control unit described above) and adjust the load placed on the engine to reach a target horsepower defined by the requested propel call. The fuel control unit may adjust engine fueling to reach the commanded speed. The method then ends. In other embodiments, the propel call may be less than full throttle.

If a full call request is received, the method proceeds to 306 to determine a target horsepower (HP). The target HP may be determined according to a suitable mechanism. In one example, the target HP may be a target determined during a previous operation, or may be a target determined by a user, such as an operator of the vehicle or a remote operator in communication with the vehicle. The target HP may be the maximum HP the engine is capable of providing. In another example, the target HP may be a default HP, such as 90% of peak configured HP. Further, the target HP may be adjusted based on operating conditions. For example, the default target HP described above may be adjusted based on vehicle weight, as indicated at step 308. As vehicle weight increases, the target HP may increase to allow the vehicle to maintain a desired vehicle speed. In another example, the default target HP may be adjusted based on the grade at which the vehicle is traveling, as indicated at step 310. This may include increasing the target HP as grade increases. In a further example, the default target HP may be adjusted based on vehicle speed, as indicated at step 312. This may include increasing the target HP as vehicle speed increases. Additionally, in some examples, the default target HP may be adjusted based on user input, as indicated at step 314. Further, the target HP may be within a range of 60-100% of maximum rated HP for the vehicle.

At 316, a rated engine speed is determined based on the target HP. In one example, the rated engine speed may be obtained from a look-up table that is indexed to the target HP, or according to another suitable mechanism. The rated engine speed may be an engine speed that corresponds to maximum torque for the engine, for example, in order to operate the engine at high efficiency. In an example, the control unit may be configured to adjust the look-up table that indexes rated engine speed to target HP based on past engine operation. For example, once operation at maximum torque is achieved, if one or more of the engine speed or HP achieved at the maximum torque deviates from the values in the table, the table may be adjusted. At step 318, a first engine speed command is sent to the separate fuel control unit. The first engine speed command may be the rated engine speed determined above in one example. In another example, the first engine speed may be an engine speed that is slightly above the rated engine speed, such as between 1-5% above the rated engine speed or a set speed above the rated engine speed, such as 30 RPM above the rated engine speed. In this way, the separate fuel control unit may adjust fueling to the engine to attempt to reach the first engine speed command.

At step 320, the load placed on the engine is adjusted to reach the rated engine speed. The load may be placed on the engine by the alternator, and thus alternator load may be adjusted (e.g., electrical loads on the alternator coupled or uncoupled or other suitable mechanism) to adjust the engine load. The load placed on the engine may be adjusted concurrent to the fueling adjustment performed by the fuel control unit to reach the rated engine speed. If the first engine speed command is larger than the rated engine speed, the load placed on the engine by the alternator acts to drag engine speed down from the commanded engine speed. In doing so, the engine may be operated at its maximum torque line for a given engine speed, achieving higher efficiency. Further, the rated engine speed may be a lower speed than the maximum rated speed, thus enabling a reduction in fuel consumption.

As explained above, the load placed on the engine acts to drag the engine speed down to the rated speed. Once the rated engine speed is reached, the speed command sent to the fuel control unit may be adjusted to bring the engine speed down after the designated period. Thus, at step 322, the method includes adjusting the engine speed command to a second engine speed command that is more fuel efficient (and generally lower) than the first engine speed. The engine speed command may be adjusted based on the factors described herein. The method then ends. Optionally, the controller may make additional adjustments to the engine speed based on other factors. In at least one embodiment, anticipatory signals that performance mode may be needed or desired will cause the controller to ramp the engine speed back to the first (higher) engine speed to put the system into performance mode. These signals may come from determined tables available to the controller, from learnings based on artificial intelligence (AI) algorithms, from activities performed by an operator (whether on the vehicle or remote from it), or from external activities (such as a call for work, an approaching vehicle, a load sensor that indicates that a previously empty haul truck is now full with a payload, and the like).

When the load placed on the engine drags the engine speed down, the amount of fuel supplied to the engine may continue to increase as the load is applied to the engine as the fuel control unit attempts to reach the commanded first engine speed. After the steady state is achieved and maintained for the designated period, the fuel supplied to the engine is decreased to the second operating state (the fuel saver mode).

Thus, according to the method shown in the diagram of FIG. 3, the engine speed may be adjusted to reach the targeted HP at one of the efficient operating points of the engine. In one embodiment, this may be when the engine is on the max torque curve. In some examples, the method may increase or reduce engine speed in a controlled manner while continuing to fully load the engine at that speed. The method may be implemented according to a control scheme with an outer control loop trying to reach a specific HP set point adjusting the engine speed setpoint and an inner loop adjusting the HP load applied to the engine to hold engine speed to the setpoint.

Figure 4:
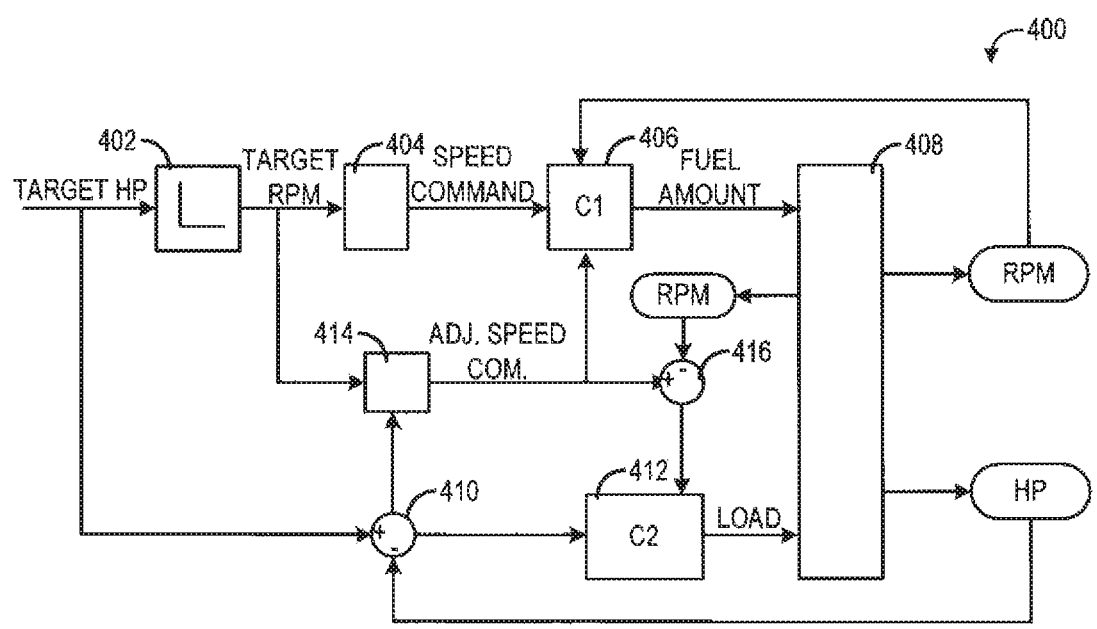
FIG. 4 is an example control diagram.

FIG. 4 is a diagram 400 illustrating an example control routine for adjusting an engine to operate at a target horsepower. In one example, the control routine of diagram 400 may be enacted during a propel call. The control routine of diagram may represent the inputs, outputs, and actions taken by the controller during the execution of method of FIG. 3, described above. As described previously and in more detail below, the controller may be comprised of separate control units, including a first control unit for regulating fuel to the engine and a second control unit for regulating the load placed on the engine by the drive system.

As shown in the diagram, in a first loop of the control diagram, a target horsepower is obtained in a suitable manner (e.g., from a remote dispatch, based on operating parameters, etc.) and is entered into a look-up table 402 in order to obtain a target or rated engine speed. The target engine speed is input to offset block 404, which adds an offset (e.g., 30 RPM) to the target engine speed to produce an engine speed command that is entered into a first control block 406 (which may be located on the fuel control unit) to determine a fuel amount to supply to the engine. The fuel amount may represent the amount of fuel that is to be supplied by each fuel injector of the engine, or it may represent a total amount of fuel to be supplied per engine cycle, for example. The amount of fuel is supplied to the engine (represented by block 408). As the engine operates, engine speed (RPM) and output (HP) are measured by the respective sensors.

In a second loop of the control diagram, the target horsepower is compared to the measured horsepower at a load error block 410. The difference between the target and measured horsepower is input into a speed control block 414 along with the target engine speed to determine an adjustment to the speed command. The adjusted speed command (e.g., second engine speed command described above with respect to FIG. 3) comprises the speed that the drive system control unit loads the engine down to reach. In some examples, the speed control block may maintain the commanded engine speed at the first speed until measured engine speed (or HP) stays at a steady state for a designated period, at which time the engine speed command may be adjusted (e.g., lowered) to a fuel saver operating mode. The adjusted engine speed command is also input into a speed error block 416 to determine the difference between the adjusted speed command and actual engine speed. This error is input into a second control block 412 along with the error determined at block 410. Based on the difference between the measured engine speed and the adjusted engine speed command, the second control block determines an amount of load to place on the engine by the alternator. For example, if the measured horsepower is less than the target horsepower, additional load may be placed on the engine by the alternator.

As explained above, the first control block may be located on the fuel control unit while the second control block, along with the map look-up, offset block, speed adjustment block, load error block, and speed error block, may be located on the drive system control unit.

Figure 5:
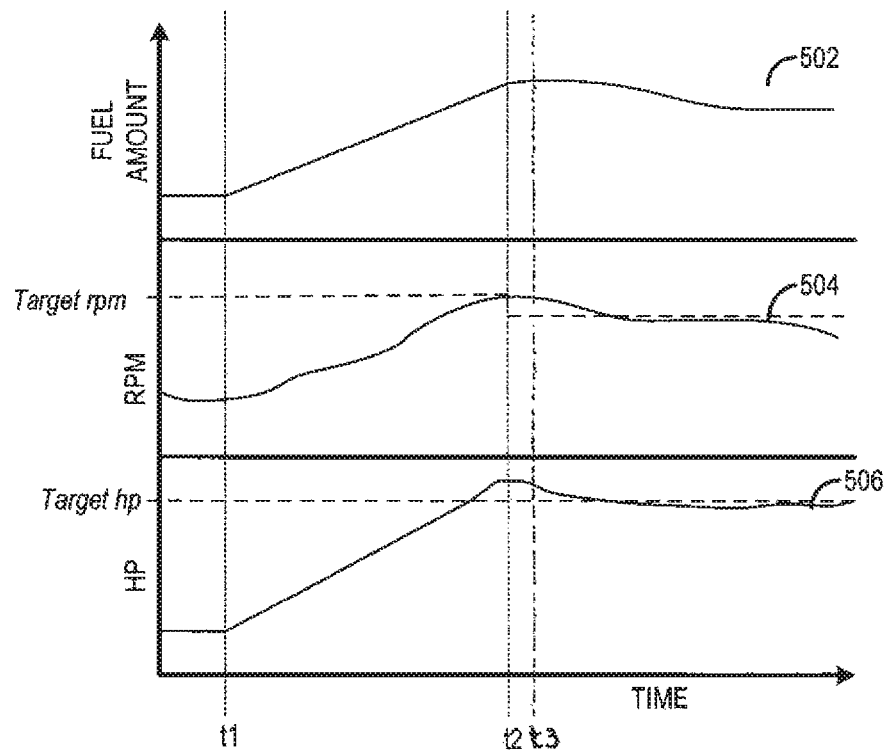
FIG. 5 is a diagram illustrating example engine parameters during operation of the vehicle of FIG. 2.

FIG. 5 is a diagram 500 illustrating example operating parameters during execution of the control routine of FIG. 4 and/or the method of FIG. 3. The diagram illustrates a fuel amount supplied to engine represented by curve 502, engine speed represented by curve 504, and engine output (HP) represented by curve 506. For each operating parameter, time is depicted along the x-axis and respective values for each parameter is depicted along the y-axis.

Prior to time t1, the vehicle may be operating at a steady, less-than-full propel call. For example, the vehicle may be traveling on a flat surface prior to reaching a grade out of a mine quarry. Accordingly, the engine is operating at less than maximum fueling, engine speed, and load. At time t1, an operator may request a full propel call (e.g., maximum throttle) in response to starting to ascend a steep grade out of the quarry, for example. In order to reach the target horsepower set for full call, the amount of fuel supplied to the engine increases in order to increase engine speed. Engine horsepower also begins to increase. At time t2, engine speed reaches the target speed and the designated period countdown elapse. At time t3, the designated period elapse and the controller switches the operating mode from performance to fuel saving. Due to the reduction in engine speed (with or without maintaining operation at full target horsepower), the amount of fuel that is supplied to the engine decreases, thus resulting in decreased fuel consumption.

The method, control diagram, and corresponding operating parameters described above with respect to FIGS. 3-5 disclosed an example of reaching a target engine speed and/or horsepower in response to a request to operate at an engine output. The mechanism of reaching a target engine speed may be applied during various operating conditions, such when full call is not requested but the requested engine output is relatively close to full call, such as >80% maximum output. For example, if a first vehicle is climbing a hill and reaches a threshold distance from a second vehicle traveling in front of the first vehicle, the operator of the first vehicle may reduce engine output to avoid hitting or otherwise traveling too close to the second vehicle. In such an example, the target engine speed for the first vehicle may be reduced and the new engine speed reached according to the method described above. Further, if the operator of the first vehicle subsequently returned to full propel call, the same mechanism could be used to reach the full target horsepower.

Figure 6:
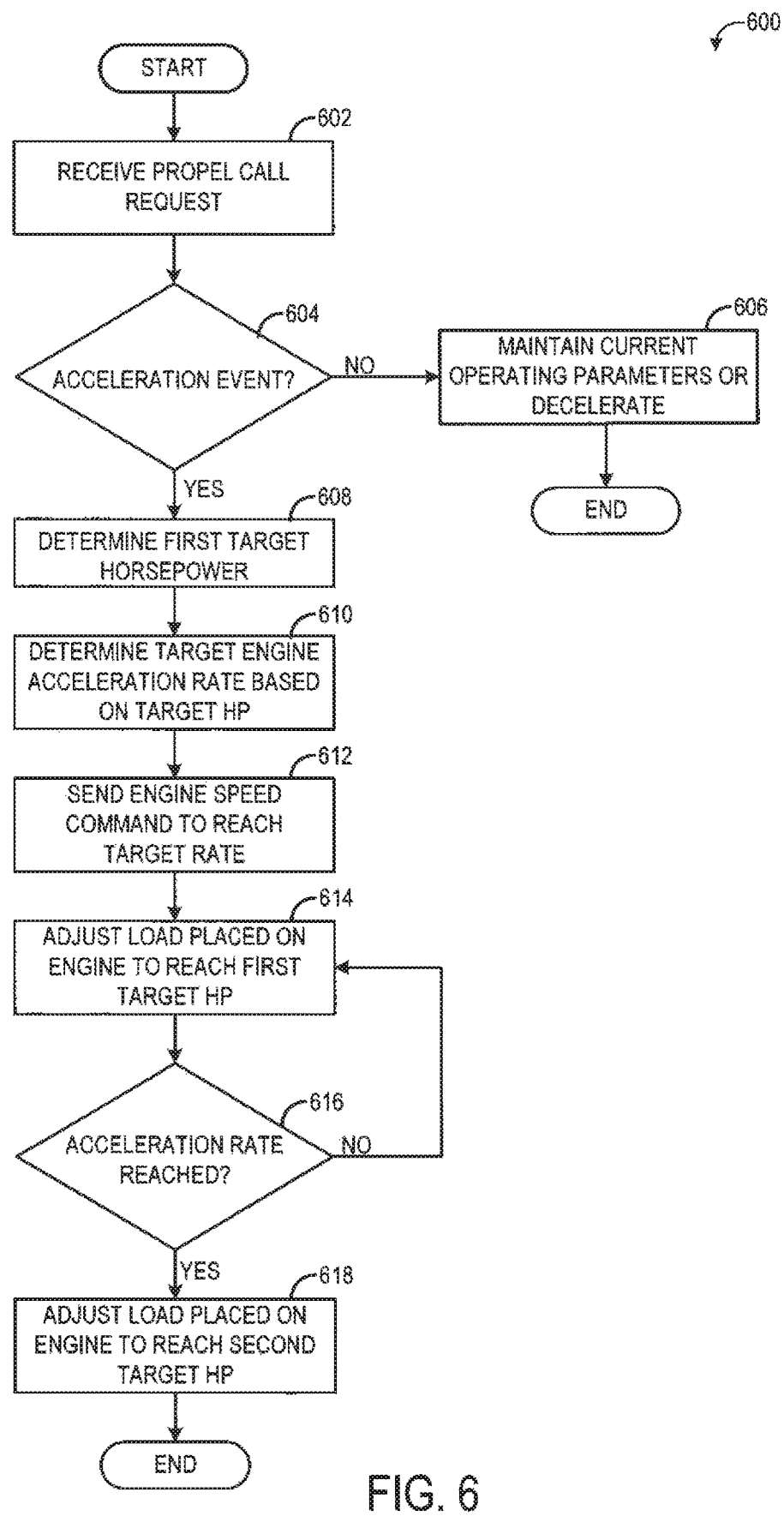
FIGS. 6, 7, 8, 9, 10, and 11 are flow charts illustrating additional example methods for operating the vehicle of FIG. 2.

In another example, the method for reaching the target horsepower described above may be used during an acceleration event that may not necessarily include a request to operate a full propel call. Further, in some examples it may be desirable to slow down the rate of the increase in engine speed when attempting to reach the target horsepower in response to a request to operate at maximum engine output, in order to reduce fuel consumption during the acceleration. FIG. 6 illustrates a method 600 for operating an engine during an acceleration event. The method may be performed by a controller, such as the controller described above, in combination with various sensors and actuators, such as an engine speed sensor, engine output sensor, fuel injectors, etc., according to instructions stored on memory of the controller.

At step 602, the method includes receiving a propel call request, e.g., a power setting requested by an operator of the vehicle. At step 604, the method determines if the request includes an acceleration event, for example if the request includes an increase in requested power. If no, the method proceeds to step 606 to maintain current operating parameters, which may include maintaining current engine speed and/or horsepower, or to initiate a deceleration. The method then returns.

If an acceleration event is requested, the method proceeds to step 608 to determine a first target engine speed. However, the first target engine speed may be a different engine speed than the target engine speed that is desired for the requested propel call in order to increase or decrease the rate of the acceleration.

At step 610, a target engine acceleration rate may be determined based on the target engine speed, for example from a look-up table. At step 612, an engine speed command is sent from the drive system control unit to the fuel control unit in order to reach the target acceleration rate. Further, at step 614, the load placed on the engine by the alternator may be adjusted to reach the first target horsepower.

At step 616, it is determined if the first acceleration rate is reached. If not, the method loops back to step 614 to continue to adjust the loading of the engine until the target rate is reached. Once the target rate is reached, the designated period of steady state begins. When the designated period elapses, the method proceeds to step 618 to adjust the load placed on the engine to reach a second target HP, with an associated second target engine speed. The second target engine speed may be different than the first target engine speed, for example it may be lower. In this way, the engine may be rapidly accelerated until a desired acceleration rate is achieved, and then the target engine speed may be lowered to maintain the target acceleration rate. Further, in some examples, once a target engine speed has been reached, the loading on the engine may be adjusted to reach a third target engine speed, which may be the same as the second target engine speed, or it may be different based at least in part on application specific parameters.

Off-highway vehicles, such as mine haul vehicles, may be operated in a convoy over cycles that include a trip from a loading site to a dump site and back, for example. These mine haul cycles may be limited by the slowest vehicle configuration within the convoy. A lower power to gross vehicle weight (GVW) haul truck can limit on-grade speed for a much faster haulage class configuration. A single slow truck with low HP or overloaded of identical haulage configuration can also slow on grade speeds. In these scenarios, where convoy includes vehicles with mixed configurations, a mine may benefit from simple HP/ton GVW matching.

Figure 7:
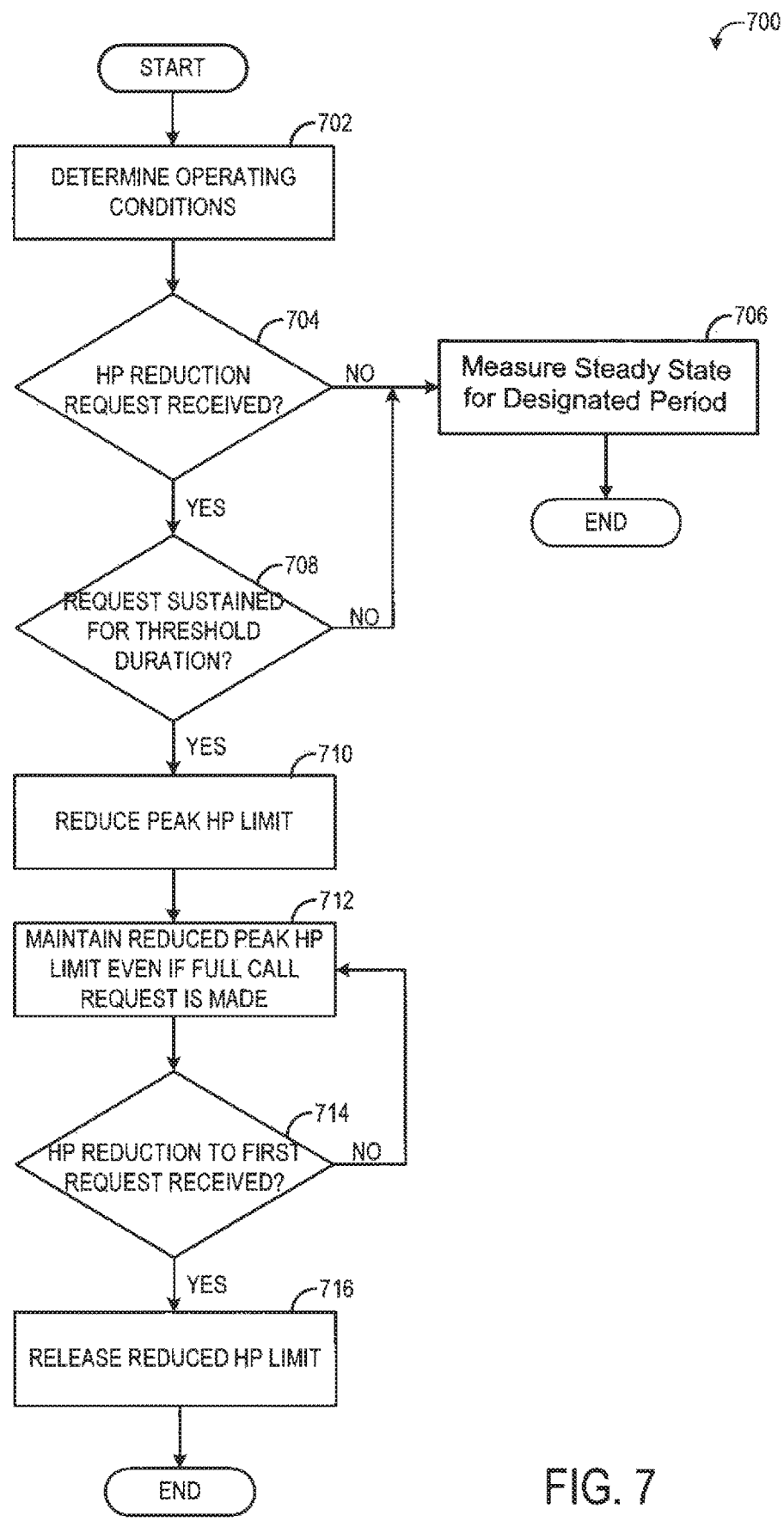

FIG. 7 illustrates a method 700 for limiting target engine speed based on an external factor, such as a nearby traveling vehicle. At step 702, the method includes determining operating conditions such as the external factors. Specifically, for this example, the vehicle is traveling in a consist or convoy with other vehicles and is being controlled so as to avoid collision with the other vehicles. At step 704, if the vehicle is determined to be going too fast such that it is gaining on a vehicle in its path of travel, there is a request made for a reduction of HP being produced and supplied to the traction motors. In some instances, coordination with braking effort is made. However, the use of brakes is less optimal for fuel efficiency than reducing the HP/engine speed of the engine. In cases where the vehicle is being manually controlled rather than remotely or autonomously operated, a vehicle operator may reduce an accelerator request. In some examples, only a change of load call greater than a threshold may be detected, such as a reduction to 80% or 90% load or a change of 3% or greater from full call. If no reduction has been requested, the method proceeds to step 706 to measure the steady state until the designated period has elapsed, and then reduces the engine speed by switching to the fuel saving operating mode. If a reduction has been requested, the method proceeds to step 708 to determine if the reduction request has been sustained for a threshold duration, such as 30 seconds. If no, the method proceeds to step 706 and then ends.

If yes, the method proceeds to step 710 to reduce the peak HP limit. The peak HP limit may be set at a percentage of the target HP determined according to the method of FIG. 3, for example. In the example described above, a 90% call may result in a reduced HP limit of 90% of the target HP. However, the HP limit may be reduced according to a suitable mechanism. The reduced HP limit may be maintained, even after the operator returns to the accelerator to the full call position, as indicated at step 712. A Diagnostic Information Display (DID) can be used to have a tab with what HP limit is being applied, so that if there is a question if this limit is being applied it can be displayed in real time to operator.

To release the reduced HP limit, the method determines if the accelerator has been released to or past the original reduced load call at step 714. If no, the method returns to step 712 to continue to operate with the reduced peak HP limit. If yes, the method proceeds to step 716 to release the reduced HP limit and return to the target HP limit. The method then ends.

Thus, the method provides for imposing a reduced HP limit once a load reduction request has been sustained. For example, after 0.5 minute of stable decreased performance operation the system reduces peak HP capability to allow an operator to maintain the reduced performance speed at a full pedal request.

Full HP can be requested by the operator releasing the accelerator pedal to the previous level or less than the previous level that prompted the reduced performance. In the 90% call example, the operator could let off the pedal to 90% and speed on grade would not change, but re-application would allow 100% full HP again.

This reduced peak HP limit feature described above may be utilized to identify a mine that is running a mixed fleet and would benefit significantly by having a reduced HP on the faster vehicles. This should eliminate the need for mine to be adjusting each vehicle to specific HP to match haul speeds of various vehicles.

To facilitate this analysis, the following inputs may be used: enable HP reduction feature, HP Δ per haul cycle, time at reduced HP on grade to trigger HP change for next cycle, time at full propel call on grade to trigger HP change for next cycle, and minimum % call to enable the feature (default 70%). By analyzing this information over one or more haul cycles, it may be determined that a vehicle is operating at less-than-full call a significant amount of time, and its peak HP limit may be reduced, not just transiently but permanently, until further analysis reveals the vehicle is once again operating at full call a majority of the time, at which time the peak HP limit may be increased. When operating with a reduced peak HP limit, a Diagnostic Information Display (DID) can be used to have a tab with what HP limit is being applied (or another output mechanism may be activated, such as an indicator light), so that if there is question if this limit is being applied it can be displayed in real time to the operator.

Figure 8:
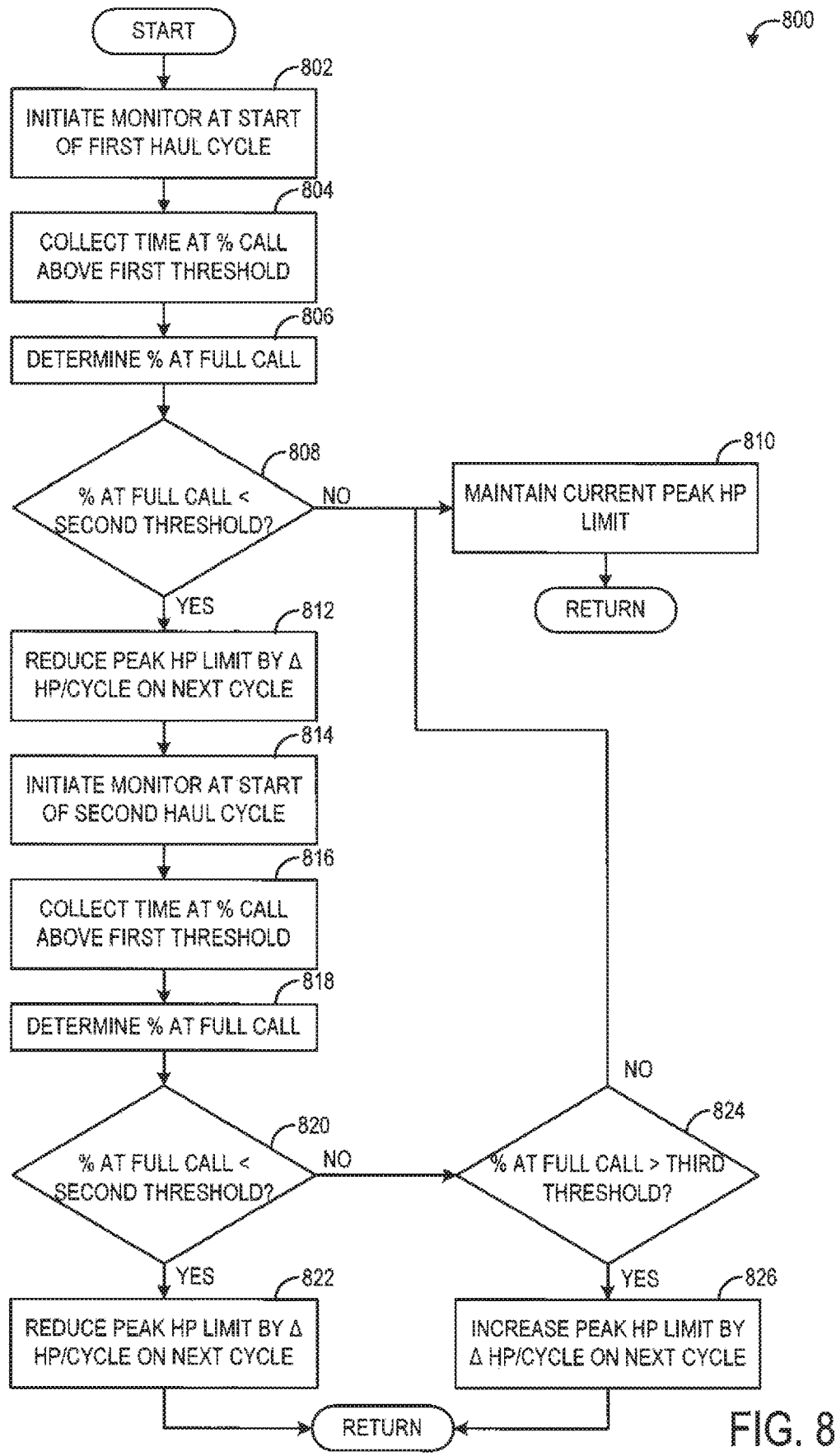
Figure 9:
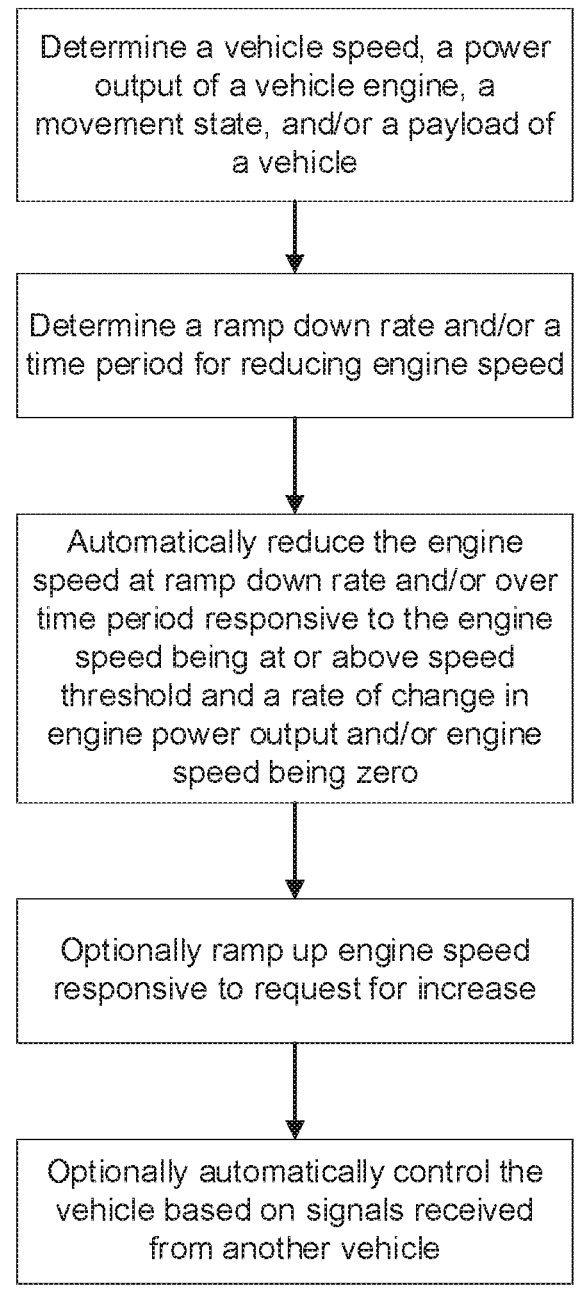
Figure 10:
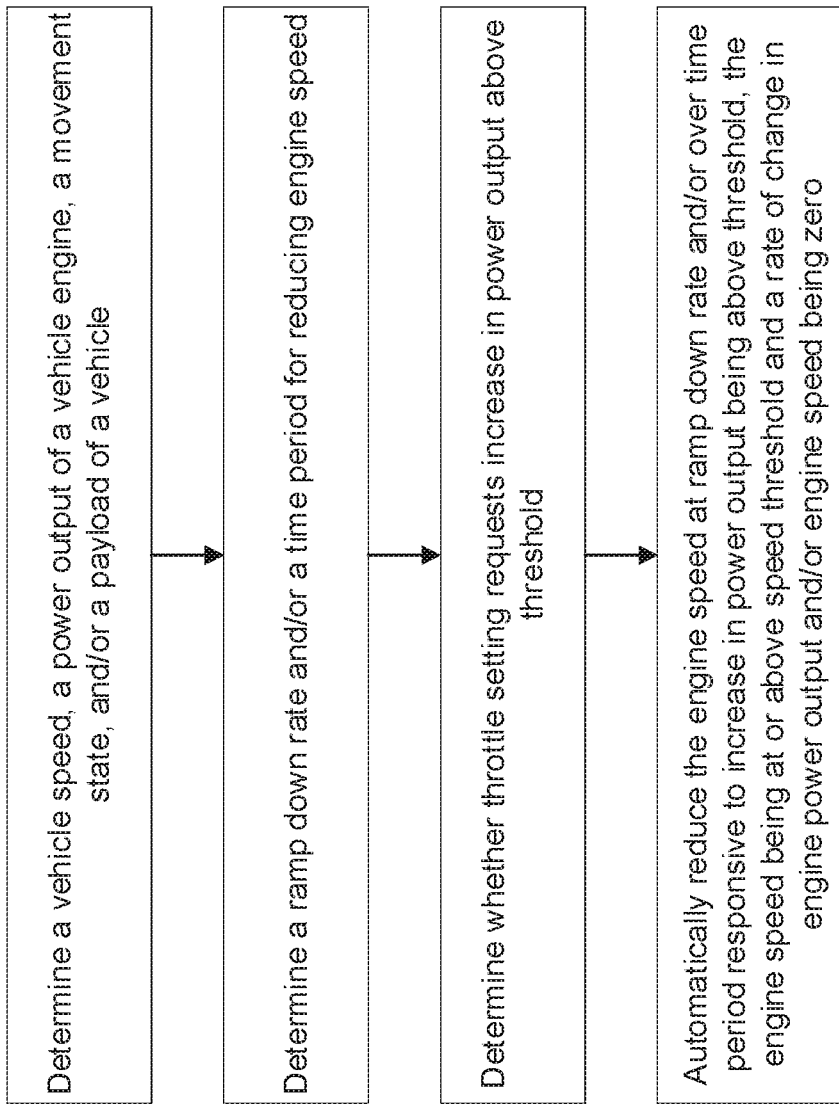
Figure 11:
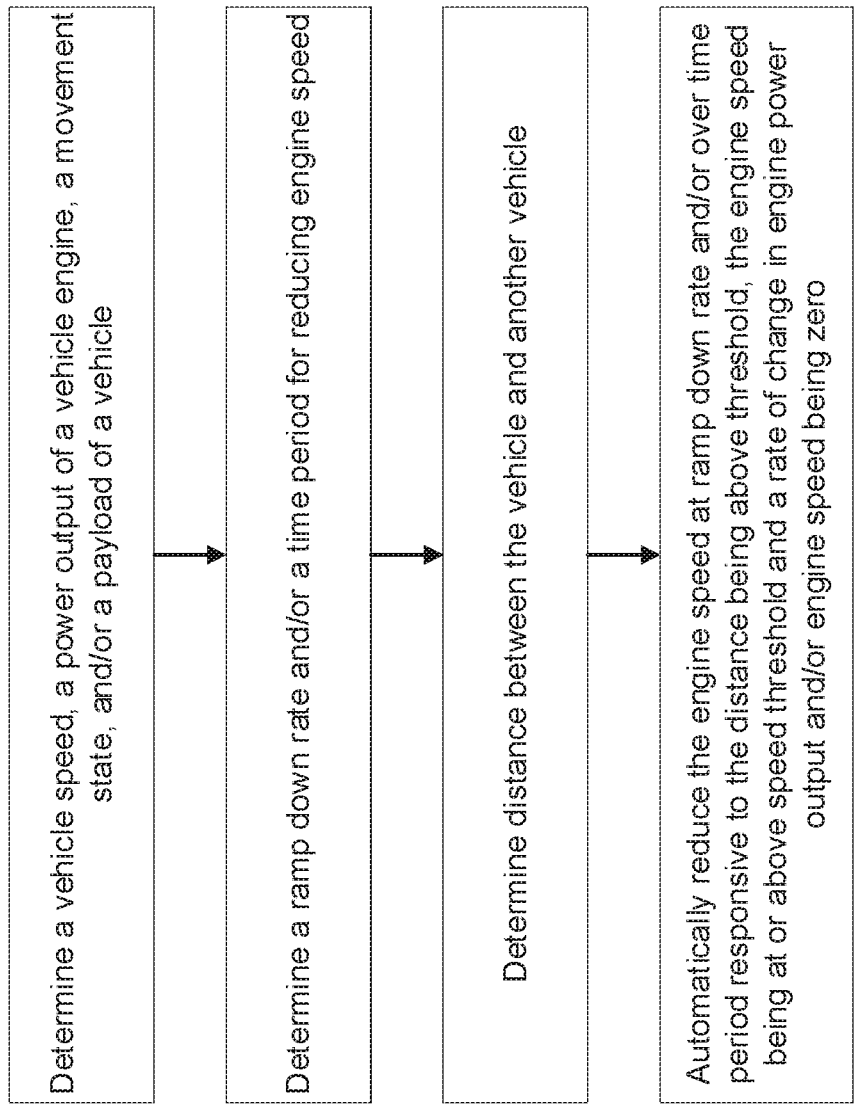

FIG. 8 illustrates a method 800 for a smart maximum HP limit over a long cycle.

At step 802, the method includes initiating a monitor at the start of a first haul cycle. The monitor may collect the information described above, including collecting an amount of time above a threshold % call (e.g., 70%) at step 804. This may include, in some examples, collecting the amount of time spent on a grade, which may be determined by evaluating torque applied by the wheel motors or speed and power, or may be determined by measuring incline with a sensor. At step 806, the proportion of time spent at full call is determined. In some examples, this may include determining the proportion of time spent at full call while operating on a grade (e.g., a grade of greater than 0%). At step 808, the method determines if the percent time at full call is less than a second threshold. The second threshold may be a suitable threshold that indicates the vehicle desired power may be limited by another vehicle in the convoy, such as 90%, 80%, or other suitable threshold. If the percent at full call is not less than the second threshold, the method proceeds to step 810 to maintain a current peak HP limit, and then the method returns. If the percent at full call is less than the second threshold, the method proceeds to step 812 to reduce the peak HP limit by a ΔHP/cycle on the next haul cycle. The ΔHP/cycle may be a fixed value (e.g., 5%), or it may represent the average change in HP over the current and/or previous haul cycles.

At step 814, the monitor is initiated at the start of the next haul cycle. The monitor collects the time at the percent call above the first threshold at step 816 and determines the percent at full call at step 818. At step 820, the method determines if the percent at full call is less than the second threshold. If yes, the method proceeds to step 822 to reduce the peak HP limit by ΔHP/cycle on the next cycle, and then the method returns. However, if the answer at step 820 is no, the method proceeds to step 824 to determine if the percent at full call is greater than a third threshold, higher than the second threshold. If the answer is no, the method proceeds to step 810 to maintain current operating parameters. If the answer is yes, the method proceeds to step 826 to increase the peak HP limit by ΔHP/cycle on the next cycle, and then the method returns.

Thus, according to the method, for each cycle the propel call (while above a minimum percentage propel call) is collected. If the vehicle spends a significant amount of time below full propel call, the system will remove HP from the system limit using the HP Δ per haul parameter. If the next cycle has a long period of time at the 100% (indicates increased HP could be utilized) the next cycle will be increased by the HP Δ. The increase function is needed because if all vehicles have a continually reducing HP feature and no way to increase it automatically then natural load variation could cause such a feature to continually reduce fleet HP/engine speed/vehicle speed. In some examples, the amount of HP that can be removed by this feature may be limited by a determined bound, for example up to 10%. Further, in some examples, the Δ hp/cycle may be obtained from a look-up table based on the average propel call percent (e.g., a lower average propel call percent causes a larger adjustment after that cycle).

Thus, the methods and systems described above provide for multiple mechanisms for adjusting engine speed and/or power output of an off-highway vehicle. In one example, an adjustable engine speed target may be used, and the target engine speed may be determined based on a target HP. The target engine speed may be adjusted to include an offset such that the engine is commanded to operate a higher engine speed than the target, and the engine may be loaded to drag engine speed down to the target speed. Further, once the target engine speed is reached, if the engine is not operating at the target HP, the engine speed commanded to the engine may be adjusted until the engine output reaches the target HP. This feature may reduce rated speed in a continuous fashion to the minimum needed to make rated power, while providing closed loop on traction power. The engine speed setpoint may be moved up or down to make desired HP, which produces a desired power output, which itself provides voltage and current to traction motors to generate tractive effort.

Another embodiment for a system for a vehicle comprises an engine having a plurality of cylinders; a fuel system to supply fuel to the engine; a drive system including an alternator to provide electrical energy to a plurality of traction motors, the alternator driven by the engine; and a drive system controller configured to send a command operable to control the fuel system to supply an amount of fuel to the engine based on a target engine speed and a lower fuel saver engine speed. And, the controller can direct the drive system to adjust a load placed on the engine generate horsepower to reach a target engine speed.

The drive system controller is configured to adjust the load placed on the engine and the engine speed by placing a load on the engine from the alternator. The target engine speed may comprise an engine speed that is greater than a selected engine speed that is selected based on the target engine horsepower. In one example, the target engine horsepower is received from a remote dispatch system.

An embodiment relates to a method, comprising responsive to receiving a request to increase engine power, adjusting an engine speed command to reach a target engine acceleration rate, and adjusting a load placed on the engine based on a first target horsepower; and once the target engine acceleration rate is reached and maintained for designated period, adjusting the load placed on the engine to achieve a second target engine speed. In an example, the second target engine speed is lower than the first target engine speed. The method further determines a target horsepower based on the second target engine speed, and adjusts the engine speed command to reach the target second engine speed. Adjusting the engine speed command may include adjusting an engine speed command sent to a remote engine fuel controller, and adjusting the load placed on the engine may include adjusting a load placed on the engine by an alternator.

In any of the embodiments herein, the vehicle may be a mining haul truck or other relatively large land vehicle having a gross operating weight of 50 tons or more, e.g., 50 tons to more than 500 tons. The vehicle includes an internal combustion engine (e.g., diesel engine) that drives a generator or alternator, responsive to which the generator or alternator produces sufficient electrical power (e.g., 1000s of horsepower equivalent) to run one or more (e.g., two to four) electrical traction motors (e.g. wheel hub motor units) to cause the vehicle, when loaded up to its maximum payload, to move. A speed of the engine is mechanically decoupled from a speed of the vehicle, as discussed above. For example, the vehicle may lack a mechanical transmission for mechanically transmitting engine output power to wheels of the vehicle for movement.

In an embodiment, a method includes reducing automatically a speed of an engine from a first speed value to a second speed value in response to both the first speed value being at or above a first speed threshold value and a rate of change of one or both of (i) engine power and (ii) the engine speed being substantially zero for a designated period. The method may be carried out by a controller. The engine may be operably disposed in a vehicle.

In any of the embodiments herein, the method may further include (e.g., with a controller), after the speed is automatically reduced from the first speed value to the second speed value, increasing automatically the speed of the engine from the second speed value back up to the first speed value (or another, higher speed value), responsive to one or more designated criteria being met while the engine is operating at the second speed value. For example, responsive to a throttle command or change in throttle command, responsive to vehicle deceleration above a threshold when the vehicle is not braking (e.g., as might happen upon encountering an incline), responsive to information of a route database relative to current vehicle location (e.g., the information indicating an upcoming incline), responsive to a trip plan according to which the controller automatically controls the vehicle as a function of current location and route, responsive to position and/or movement of other vehicles, responsive to emissions control strategies, responsive to vehicle auxiliary loads, responsive to incline sensing signals, etc.

In an embodiment, a method includes reducing automatically a speed of an engine from a first speed value to a second speed value in response to both the first speed value being at or above a first speed threshold value and a rate of change of one or both of (i) engine power and (ii) the engine speed being substantially zero for a designated period. The first speed value is a speed at which the engine provides a predesignated performance level or a predesignated torque level in a designated range of performance or torque during an acceleration transient event. The method may be carried out by a controller.

In an embodiment, a method includes reducing automatically a speed of an engine from a first speed value to a second speed value in response to both the first speed value being at or above a first speed threshold value and a rate of change of one or both of (i) engine power and (ii) the engine speed being substantially zero for a designated period. The step of reducing comprises ramping down the engine speed at a controlled rate until the second speed value is achieved, and the second speed value is an engine speed that is more fuel efficient than the first speed value. The method may be carried out by a controller.

In an embodiment, a method includes reducing automatically a speed of an engine from a first speed value to a second speed value in response to both the first speed value being at or above a first speed threshold value and a rate of change of one or both of (i) engine power and (ii) the engine speed being substantially zero for a designated period. The engine is disposed in a vehicle. The method further includes responding to a request for an increase in one or more of engine power, engine torque, engine speed, or vehicle speed from an operator or controller of the vehicle by ramping up the engine speed from a lower engine starting speed value to the first speed value. In another embodiment, the ramping up of the engine speed is at a controlled rate until the first speed value is achieved, and the ramping up rate is at or near a maximum available rate of ramping up the engine speed. The method(s) may be carried out by a controller.

In an embodiment, a method includes reducing automatically a speed of an engine from a first speed value to a second speed value in response to both the first speed value being at or above a first speed threshold value and a rate of change of one or both of (i) engine power and (ii) the engine speed being substantially zero for a designated period. The method further includes ramping down the engine speed at a controlled rate from the first speed value to the second speed value, and the second speed value is an engine speed that is more fuel efficient than the first speed value. The method may be carried out by a controller.

In an embodiment, a method includes reducing automatically a speed of an engine from a first speed value to a second speed value in response to both the first speed value being at or above a first speed threshold value and a rate of change of one or both of (i) engine power and (ii) the engine speed being substantially zero for a designated period. The engine is disposed in a vehicle. The method further includes responding to a measured, estimated or calculated speed of the vehicle or another vehicle to determine one or both of: a ramp down rate of reducing the engine speed from the first speed value to the second speed value; or the length of the designated period for which the rate of change of one or both of (i) engine power and (ii) the engine speed is substantially zero before initiation of automatically reducing the engine speed from the first speed value to the second speed value. The method may be carried out by a controller.

In an embodiment, a method includes reducing automatically a speed of an engine from a first speed value to a second speed value in response to both the first speed value being at or above a first speed threshold value and a rate of change of one or both of (i) engine power and (ii) the engine speed being substantially zero for a designated period. The engine is disposed in a vehicle. The method further includes determining, based at least in part on a status of the vehicle being in a loaded, partially loaded or empty state, one or both of: a ramp down rate of reducing the engine speed from the first speed value to the second speed value; and/or a length of the designated period for the rate of change. The method may be carried out by a controller.

In an embodiment, a method includes reducing automatically a speed of an engine from a first speed value to a second speed value in response to both the first speed value being at or above a first speed threshold value and a rate of change of one or both of (i) engine power and (ii) the engine speed being substantially zero for a designated period. The engine is disposed in a vehicle. The method further includes determining, based at least in part on a grade on which the vehicle is located at the time the engine speed is to transition from the first speed value to the second speed value, one or both of: a ramp down rate of reducing the engine speed from the first speed value to the second speed value; and/or a length of the designated period for the rate of change. The method may be carried out by a controller.

In an embodiment, a method includes reducing automatically a speed of an engine from a first speed value to a second speed value in response to both the first speed value being at or above a first speed threshold value and a rate of change of one or both of (i) engine power and (ii) the engine speed being substantially zero for a designated period. The engine is disposed in a vehicle. The method further includes determining one or both of: a ramp down rate of reducing the engine speed from the first speed value to the second speed value; and/or a length of the designated period for the rate of change, and wherein the determination is based at least in part on: an absolute throttle condition, such that a requested power change must be larger than a designated threshold value to initiate the reducing; and/or an environmental condition, such that the vehicle must be spaced from a second vehicle by a designated distance to initiate the reducing, and the distance is designated at least in part based on the vehicle speeds of the each of the vehicle and the second vehicle. The method may be carried out by a controller.

In an embodiment, a method includes reducing automatically a speed of an engine from a first speed value to a second speed value in response to both the first speed value being at or above a first speed threshold value and a rate of change of one or both of (i) engine power and (ii) the engine speed being substantially zero for a designated period. The method further includes determining a power state of the engine, wherein the method further comprises, in a first mode responsive to the power state indicating that the engine is producing about 50% or more of the engine's maximum power output, switching or maintaining an operating mode of the engine to be more responsive in terms of the designated period being longer than compared to a length of time of the designated period when the power state is indicative of the engine producing less than about 50% of its maximum power. The method may be carried out by a controller.

In an embodiment, a method includes reducing automatically a speed of an engine from a first speed value to a second speed value in response to both the first speed value being at or above a first speed threshold value and a rate of change of one or both of (i) engine power and (ii) the engine speed being substantially zero for a designated period. The engine is disposed in a vehicle. The method further includes determining a movement state of the vehicle, wherein in a first mode responsive to the movement state corresponding to the vehicle moving, the designated period is longer than when the movement state corresponds to the vehicle being stopped, and wherein in a second mode responsive to the movement state corresponding to the vehicle being stopped, the designated period is shorter than when the movement state corresponds to the vehicle moving. The method may be carried out by a controller.

In an embodiment, a method includes reducing automatically a speed of an engine from a first speed value to a second speed value in response to both the first speed value being at or above a first speed threshold value and a rate of change of one or both of (i) engine power and (ii) the engine speed being substantially zero for a designated period. The engine is disposed in a vehicle. The method further includes: determining that the vehicle is carrying a payload, responsive to which the designated period has a first duration; and determining that the vehicle is about empty, responsive to which the designated period has a second duration that is longer than the first duration. The method may be carried out by a controller.

In an embodiment, a method includes reducing automatically a speed of an engine from a first speed value to a second speed value in response to both the first speed value being at or above a first speed threshold value and a rate of change of one or both of (i) engine power and (ii) the engine speed being substantially zero for a designated period. The second speed value is associated with a fuel-saving power rating, and one or both of: the fuel-saving power rating differs from a maximum power rating of the engine by more than a first designated amount; and/or the second speed value differs from a maximum speed rating of the engine by more than a second designated amount. The method may be carried out by a controller.

In an embodiment, a method includes reducing automatically a speed of an engine from a first speed value to a second speed value in response to both the first speed value being at or above a first speed threshold value and a rate of change of one or both of (i) engine power and (ii) the engine speed being substantially zero for a designated period. The engine is disposed in an unmanned, first vehicle. The method further comprises automatically controlling the first vehicle based at least in part on signals received from a second vehicle that is logically or mechanically coupled with the first vehicle for coordinated travel along a route, and wherein the step of automatically reducing the speed of the engine is carried out, in at least one mode of operation of the first vehicle, independently of the signals received from the second vehicle. The method may be carried out by a controller.

In an embodiment, a vehicle includes an electric drive train, an engine (a speed of the engine is mechanically decoupled from a speed of the vehicle), and a controller. The controller is configured to control the speed of the engine and further configured to operate the engine in at least two or more operation modes, and to switch between the operation modes in response to a designated set of input triggers, wherein the operation modes include: a performance operation mode that maintains the engine speed at a first, higher RPM, and a fuel-saver operation mode that maintains the engine speed at a second, lower RPM than in the performance operation mode. The input triggers are based at least in part on one or more of the following: elapsing of a designated period that starts after a rate of change in one or both of (i) engine power and (ii) the engine speed is substantially zero, a spatial relationship of the vehicle relative to another vehicle, a grade upon which the vehicle is disposed, a ground speed of the vehicle, a manual setting by an operator or controller indicating a desire or need for either fuel savings or performance, a throttle setting for the engine that is at fifty percent or more of a maximum available throttle setting for the engine, a power output of the engine that is at fifty percent or more of a maximum available power output of the engine, and/or a payload of the vehicle is fifty percent or more of a maximum available payload of the vehicle.

In an embodiment, a vehicle includes an electric drive train, an engine (a speed of the engine is mechanically decoupled from a speed of the vehicle), and a controller. The controller is configured to control the speed of the engine and further configured to operate the engine in at least two or more operation modes, and to switch between the operation modes in response to a designated set of input triggers, wherein the operation modes include: a performance operation mode that maintains the engine speed at a first, higher RPM, and a fuel-saver operation mode that maintains the engine speed at a second, lower RPM than in the performance operation mode. The input triggers are based at least in part on one or more of the following: elapsing of a designated period that starts after a rate of change in one or both of (i) engine power and (ii) the engine speed is substantially zero, a spatial relationship of the vehicle relative to another vehicle, a grade upon which the vehicle is disposed, a ground speed of the vehicle, a manual setting by an operator or controller indicating a desire or need for either fuel savings or performance, a throttle setting for the engine that is at fifty percent or more of a maximum available throttle setting for the engine, a power output of the engine that is at fifty percent or more of a maximum available power output of the engine, and/or a payload of the vehicle is fifty percent or more of a maximum available payload of the vehicle. The engine speed in the performance mode is at about 1900 RPM and in the fuel-saver mode is at about 1800 RPM, and the designated period is in a range of from about 5 seconds to about 3 minutes.

In an embodiment, a vehicle includes an electric drive train, an engine (a speed of the engine is mechanically decoupled from a speed of the vehicle), and a controller. The controller is configured to control the speed of the engine and further configured to operate the engine in at least two or more operation modes, and to switch between the operation modes in response to a designated set of input triggers, wherein the operation modes include: a performance operation mode that maintains the engine speed at a first, higher RPM, and a fuel-saver operation mode that maintains the engine speed at a second, lower RPM than in the performance operation mode. The input triggers are based at least in part on one or more of the following: elapsing of a designated period that starts after a rate of change in one or both of (i) engine power and (ii) the engine speed is substantially zero, a spatial relationship of the vehicle relative to another vehicle, a grade upon which the vehicle is disposed, a ground speed of the vehicle, a manual setting by an operator or controller indicating a desire or need for either fuel savings or performance, a throttle setting for the engine that is at fifty percent or more of a maximum available throttle setting for the engine, a power output of the engine that is at fifty percent or more of a maximum available power output of the engine, and/or a payload of the vehicle is fifty percent or more of a maximum available payload of the vehicle. The controller is configured to control a ramp down rate in engine speed from the performance operation mode to the fuel-saver operation mode at a designated rate of change that is less than a maximum rate of change of engine speed possible for the engine.

In an embodiment, a vehicle includes an electric drive train, an engine (a speed of the engine is mechanically decoupled from a speed of the vehicle), and a controller. The controller is configured to control the speed of the engine and further configured to operate the engine in at least two or more operation modes, and to switch between the operation modes in response to a designated set of input triggers, wherein the operation modes include: a performance operation mode that maintains the engine speed at a first, higher RPM, and a fuel-saver operation mode that maintains the engine speed at a second, lower RPM than in the performance operation mode. The input triggers are based at least in part on one or more of the following: elapsing of a designated period that starts after a rate of change in one or both of (i) engine power and (ii) the engine speed is substantially zero, a spatial relationship of the vehicle relative to another vehicle, a grade upon which the vehicle is disposed, a ground speed of the vehicle, a manual setting by an operator or controller indicating a desire or need for either fuel savings or performance, a throttle setting for the engine that is at fifty percent or more of a maximum available throttle setting for the engine, a power output of the engine that is at fifty percent or more of a maximum available power output of the engine, and/or a payload of the vehicle is fifty percent or more of a maximum available payload of the vehicle. A third operation mode is the engine at idle, and the controller is configured to switch the engine from the fuel saver operation mode to the third operation mode where the engine is at idle.

In an embodiment, a system includes an engine and controller. A speed of the engine is mechanically decoupled from a speed of a vehicle supporting the engine. The controller is configured to control the speed of the engine and further configured to operate the engine in at least two or more operation modes including a first mode associated with a first engine speed and a second mode that maintains the engine speed at a second engine speed that is lower than the first engine speed. The controller is yet further configured to switch between the operation modes in response to an elapsing of a designated period that starts after a rate of change in one or both of (i) engine power and (ii) the engine speed is substantially zero.

In an embodiment, a system includes an engine and controller. A speed of the engine is mechanically decoupled from a speed of a vehicle supporting the engine. The controller is configured to control the speed of the engine and further configured to operate the engine in at least two or more operation modes including a first mode associated with a first engine speed and a second mode that maintains the engine speed at a second engine speed that is lower than the first engine speed. The controller is yet further configured to switch between the operation modes in response to an elapsing of a designated period that starts after a rate of change in one or both of (i) engine power and (ii) the engine speed is substantially zero. The controller is yet further configured to switch the operation mode based on one or more of: a spatial relationship of the vehicle relative to another vehicle, a grade upon which the vehicle is disposed, a ground speed of the vehicle, a manual setting by an operator or controller indicating a desire or need for either fuel savings or performance, a throttle setting for the engine that is at fifty percent or more of the maximum available throttle settings for the engine, a power output of the engine that is at fifty percent or more of the maximum available power output of the engine, and/or a payload of the vehicle is fifty percent or more of the maximum available payload of the vehicle.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property. The terms "including" and "in which" are used as the plain-language equivalents of the respective terms "comprising" and "wherein." Moreover, the terms "first," "second," and "third," etc. are used merely as labels, and are not intended to impose numerical requirements or a particular positional order on their objects. In an aspect, "can" means a controller or other component is configured to carry out the indicated function, and during at least one operational mode, does so (or would) carry out the indicated function during operation.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples that occur to those of ordinary skill in the art. Such other examples are within the scope of the claims if they have structural elements that do not differ from the literal language of the claims, or if they include equivalent structural elements with insubstantial differences from the literal language of the claims.

What is claimed is:
1. A method, comprising:
   determining one or both of (a) a ramp down rate at which an engine speed of a first vehicle is reduced from a first engine speed value to a slower, second engine speed value or (b) a designated time period during which the engine speed is reduced from the first engine speed to the second engine speed, the one or both of the ramp down rate or the designated time period determined based on a power output of the engine; and automatically reducing the engine speed of the engine from the first engine speed to the second engine speed in response to both the first engine speed being at or above a first speed threshold value and a rate of change of one or both of (i) the power output of the engine or the (ii) the engine speed being zero, wherein the engine speed is automatically reduced at the ramp down rate that is determined, the engine speed is automatically reduced over the designated time period that is determined, or the engine speed is automatically reduced at the ramp down rate that is determined over the designated time period that is determined.

2. The method of claim 1, wherein the first engine speed value is the engine speed at which the engine provides a predesignated performance level or a predesignated torque level in a designated range of performance or torque during an acceleration transient event.

3. The method of claim 1, wherein reducing the engine speed comprising ramping down the engine speed at the ramp down rate until the second ermine speed is achieved, and the second engine speed is the engine speed that is more fuel efficient than the first engine speed.

4. The method of claim 1, further comprising:
responding to a request for an increase in one or more of the engine power, torque of the engine, the engine speed, or a vehicle speed of the vehicle by ramping up the engine speed from a lower engine starting speed value to the first ermine speed.

5. The method of claim 4, wherein ramping up the engine speed occurs at a ramp up rate until the first ermine speed is achieved, and ramping up of the engine speed occurs at the ramp up rate that is at or near a maximum available rate of ramping up the engine speed.

6. The method of claim 1, wherein the designated time period is determined based on the power output of the engine such that, in a first mode, responsive to the power output of the engine being about 50% or more of a maximum power output of the engine, the designated time period is determined to be longer than when the power output of the engine is less than about 50% of the maximum power output of the engine.

7. The method of claim 1, wherein the one or both of the ramp down rate and the designated time period are determined based on a movement state of the vehicle such that
in a first mode where the movement state corresponds to the first vehicle moving, the designated time period is longer than when the movement state corresponds to the first vehicle being stopped, and
in a second mode where the movement state corresponds to the first vehicle being stopped, the designated time period is shorter than when the movement state corresponds to the first vehicle moving.

8. The method of claim 1, wherein the further comprising:
determining whether the first vehicle is carrying a payload, wherein the designated time period is determined to be longer responsive to the first vehicle not carrying the payload and is determined to be shorter responsive to the first vehicle determined to be about empty of the payload.

9. The method of claim 1, wherein the first vehicle is an unmanned, first vehicle, wherein the method further comprises:
automatically controlling the first vehicle based at least in part on one or more signals received from a second vehicle that is logically or mechanically coupled with the first vehicle for coordinated travel along a route, and wherein automatically reducing the engine speed is carried out, in at least one mode of operation of the first vehicle, separate of the one or more signals received from the second vehicle.

10. The method of claim 1, wherein the method includes determining the ramp down rate based on a vehicle speed of the first vehicle such that the ramp down rate is faster for a first vehicle speed value and is slower for a slower, second vehicle speed value.

11. The method of claim 1, wherein the method includes determining the designated time period based on a vehicle speed of the first vehicle such that the designated time period is shorter for a first vehicle speed value and is longer for a slower, second vehicle speed value.

12. The method of claim 1, further comprising:
determining whether a throttle setting of the first vehicle indicates a requested change in the power output of the engine to be greater than a designated power threshold,
wherein automatically reducing the engine speed occurs response to the first engine speed being at or above a first speed threshold value, the rate of change of the one or both of the power output of the engine and the engine speed being zero, and the requested change in the power output of the engine being greater than the designated power threshold.

13. The method of claim 1, further comprising:
determining a distance from the first vehicle to a second vehicle,
wherein automatically reducing the engine speed occurs response to the first engine speed being at or above a first speed threshold value, the rate of change of the one or both of the power output of the engine and the engine speed being zero, and the distance from the first vehicle to the second vehicle being greater than a threshold distance.

14. A system comprising:
a controller configured to determine a ramp down rate at which an engine speed of a first vehicle is reduced from a first engine speed value to a slower, second engine speed value, the controller configured to determine the ramp down rate based on an engine power output of the first vehicle,
the controller configured to automatically reduce the engine speed of the engine from the first engine speed to the second engine speed at the ramp down rate that is determined in response to:
the first engine speed being at or above a first speed threshold value, and
a rate of change of one or both of (i) the power output of the engine and (ii) the engine speed being zero.

15. The system of claim 14, wherein the controller is configured to determine the ramp down rate based on a vehicle speed of the first vehicle such that the ramp down rate is faster for a first vehicle speed value and is slower for a slower, second vehicle speed value.

16. The system of claim 14, wherein the controller is configured to determine a requested power change from the engine based on a throttle position, the controller configured to initiate reduction of the engine speed at the ramp down rate that is determined responsive to the requested power change exceeding a designated power threshold.

17. The system of claim 14, wherein the controller is configured to determine a distance from the first vehicle to a second vehicle, the controller configured to initiate reduction of the engine speed at the ramp down rate that is determined responsive to the distance exceeding a designated distance threshold.

18. A system comprising:
a controller configured to determine a designated time period over which an engine speed of a first vehicle is reduced from a first engine speed value to a slower, second engine speed value at a designated ramp down rate, the controller configured to determine the designated time period based on a power output of the engine,
the controller configured to automatically reduce the engine speed of the engine from the first engine speed to the second engine speed at the ramp down rate over the designated time period in response to:
the first engine speed being at or above a first speed threshold value, and
a rate of change of one or both of (i) the power output of the engine and (ii) the engine speed being zero.

19. The system of claim 18, wherein the controller is configured to determine the designated time period based on a vehicle speed of the first vehicle such that the designated time period is shorter for a first vehicle speed value and is longer for a slower, second vehicle speed value.

20. The system of claim 18, wherein the controller is configured to determine the designated time period based on the power output of the engine such that the designated time period is shorter for a first engine power output value and is longer for a greater, second engine power output value.

21. The system of claim 18, wherein the controller is configured to determine the designated time period based on a movement state of the first vehicle such that the designated time period is shorter when the movement state indicates that the first vehicle is stationary and is longer when the movement state indicates that the first vehicle is moving.

* * * * *

UNITED STATES PATENT AND TRADEMARK OFFICE
CERTIFICATE OF CORRECTION

PATENT NO. : 10,801,425 B2
APPLICATION NO. : 16/139462
DATED : October 13, 2020
INVENTOR(S) : Henry Todd Young It is certified that error appears in the above-identified patent and that said Letters Patent is hereby corrected as shown below:

In the Claims

Column 27, Line 22, replace "ermine" with "engine"

Column 27, Line 30, replace "ermine" with "engine"

Column 27, Line 32, replace "ermine" with "engine"

Signed and Sealed this
Twenty-second Day of November, 2022

*Katherine Kelly Vidal*

Katherine Kelly Vidal
*Director of the United States Patent and Trademark Office*